(12) United States Patent
Moskowitz et al.

(10) Patent No.: US 7,343,492 B2
(45) Date of Patent: *Mar. 11, 2008

(54) METHOD AND SYSTEM FOR DIGITAL WATERMARKING

(75) Inventors: Scott A. Moskowitz, Miami, FL (US); Marc S. Cooperman, New York, NY (US)

(73) Assignee: Wistaria Trading, Inc., Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/244,213

(22) Filed: Oct. 5, 2005

(65) Prior Publication Data

US 2006/0101269 A1 May 11, 2006

Related U.S. Application Data

(63) Continuation of application No. 09/545,589, filed on Apr. 7, 2000, now Pat. No. 7,007,166, which is a continuation of application No. 08/674,726, filed on Jul. 2, 1996.

(51) Int. Cl.
*H04L 9/00* (2006.01)

(52) U.S. Cl. ..................................................... 713/176

(58) Field of Classification Search .................... None
See application file for complete search history.

(56) References Cited

U.S. PATENT DOCUMENTS

| | | |
|---|---|---|
| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Jones et al. |
| 4,972,471 A | 11/1990 | Gross et al. |
| 4,974,210 A | 12/1990 | Nagata et al. |
| 4,977,594 A | 12/1990 | Shear |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,113,437 A | 5/1992 | Best et al. |
| 5,136,581 A | 8/1992 | Muehrcke |
| 5,161,210 A | 11/1992 | Druyvesteyn et al. |
| 5,243,423 A | 9/1993 | DeJean et al. |
| 5,243,515 A | 9/1993 | Lee |
| 5,287,407 A | 2/1994 | Holmes |
| 5,319,735 A | 6/1994 | Preuss et al. |
| 5,341,429 A | 8/1994 | Stringer et al. |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,379,345 A | 1/1995 | Greenberg |
| 5,394,324 A | 2/1995 | Clearwater |
| 5,398,285 A | 3/1995 | Borgelt et al. |
| 5,406,627 A | 4/1995 | Thompson et al. |
| 5,408,505 A | 4/1995 | Indeck et al. |
| 5,410,598 A | 4/1995 | Shear |
| 5,412,718 A | 5/1995 | Narasimhalu et al. |
| 5,418,713 A | 5/1995 | Allen |
| 5,428,606 A | 6/1995 | Moskowitz |
| 5,450,490 A | 9/1995 | Jensen et al. |
| 5,469,536 A | 11/1995 | Blank |
| 5,478,990 A | 12/1995 | Montanari et al. |
| 5,479,210 A | 12/1995 | Cawley et al. |
| 5,487,168 A | 1/1996 | Geiner et al. |
| 5,493,677 A | 2/1996 | Balogh et al. |
| 5,497,419 A | 3/1996 | Hill |

(Continued)

FOREIGN PATENT DOCUMENTS

EP 0372601 A1 6/1990

(Continued)

OTHER PUBLICATIONS

Pohlmann, Kea C., *Principles of Digital Audio*; 3rd Ed., 1995, pp. 32-37, 40-48, 138, 147-149, 332, 333, 364, 499-501, 508-509, 564-571.

(Continued)

*Primary Examiner*—Benjamin E. Lanier

(57) ABSTRACT

A method for applying a digital watermark to a content signal is disclosed. In accordance with such a method, a watermarking key is identified. The watermarking key includes a binary sequence and information describing application of that binary sequence to the content signal. The digital watermark is then encoded within the content signal at one or more locations determined by the watermarking key.

26 Claims, No Drawings

U.S. PATENT DOCUMENTS

| | | | |
|---|---|---|---|
| 5,506,795 A | 4/1996 | Yamakawa | |
| 5,513,261 A | 4/1996 | Maher | |
| 5,530,739 A | 6/1996 | Okada | |
| 5,530,751 A | 6/1996 | Morris | |
| 5,530,759 A | 6/1996 | Braudaway et al. | |
| 5,548,579 A | 8/1996 | Lebrun et al. | |
| 5,568,570 A | 10/1996 | Rabbani | |
| 5,579,124 A | 11/1996 | Aijala et al. | |
| 5,581,703 A | 12/1996 | Baugher et al. | |
| 5,583,488 A | 12/1996 | Sala et al. | |
| 5,598,470 A | 1/1997 | Cooper et al. | |
| 5,606,609 A * | 2/1997 | Houser et al. | 713/179 |
| 5,613,004 A | 3/1997 | Cooperman et al. | |
| 5,617,119 A | 4/1997 | Briggs et al. | |
| 5,625,690 A | 4/1997 | Michel et al. | |
| 5,629,980 A | 5/1997 | Stefik et al. | |
| 5,633,932 A | 5/1997 | Davis et al. | |
| 5,636,276 A | 6/1997 | Brugger | |
| 5,636,292 A | 6/1997 | Rhoads | |
| 5,640,569 A | 6/1997 | Miller et al. | |
| 5,646,997 A * | 7/1997 | Barton | 713/176 |
| 5,659,726 A | 8/1997 | Sandford, II et al. | |
| 5,664,018 A | 9/1997 | Leighton | |
| 5,673,316 A | 9/1997 | Auerbach et al. | |
| 5,680,462 A | 10/1997 | Miller et al. | |
| 5,687,236 A | 11/1997 | Moskowitz et al. | |
| 5,689,587 A | 11/1997 | Bender et al. | |
| 5,696,828 A | 12/1997 | Koopman, Jr. | |
| 5,719,937 A | 2/1998 | Warren et al. | |
| 5,721,788 A | 2/1998 | Powell et al. | |
| 5,734,752 A | 3/1998 | Knox | |
| 5,737,416 A | 4/1998 | Cooper et al. | |
| 5,737,733 A | 4/1998 | Eller | |
| 5,740,244 A | 4/1998 | Indeck et al. | |
| 5,745,569 A | 4/1998 | Moskowitz et al. | |
| 5,748,783 A | 5/1998 | Rhoads | |
| 5,751,811 A | 5/1998 | Koopman, Jr. | |
| 5,754,697 A | 5/1998 | Fu et al. | |
| 5,757,923 A | 5/1998 | Koopman, Jr. | |
| 5,765,152 A | 6/1998 | Erickson | |
| 5,774,452 A | 6/1998 | Wolosewicz | |
| 5,790,677 A | 8/1998 | Fox et al. | |
| 5,799,083 A | 8/1998 | Brothers et al. | |
| 5,809,139 A | 9/1998 | Girod et al. | |
| 5,809,160 A | 9/1998 | Powell et al. | |
| 5,828,325 A | 10/1998 | Wolosewicz et al. | |
| 5,832,119 A | 11/1998 | Rhoads | |
| 5,848,155 A | 12/1998 | Cox | |
| 5,859,920 A | 1/1999 | Daly et al. | |
| 5,870,474 A | 2/1999 | Wasilewski et al. | |
| 5,884,033 A | 3/1999 | Duvall et al. | |
| 5,889,868 A | 3/1999 | Moskowitz et al. | |
| 5,893,067 A | 4/1999 | Bender et al. | |
| 5,894,521 A | 4/1999 | Conley | |
| 5,903,721 A | 5/1999 | Sixtus | |
| 5,905,800 A * | 5/1999 | Moskowitz et al. | 380/28 |
| 5,905,975 A | 5/1999 | Ausubel | |
| 5,912,972 A | 6/1999 | Barton | |
| 5,915,027 A | 6/1999 | Cox et al. | |
| 5,917,915 A | 6/1999 | Hirose | |
| 5,920,900 A | 7/1999 | Poole et al. | |
| 5,930,369 A | 7/1999 | Cox et al. | |
| 5,930,377 A | 7/1999 | Powell et al. | |
| 5,940,134 A | 8/1999 | Wirtz | |
| 5,943,422 A | 8/1999 | Van Wie et al. | |
| 5,963,909 A | 10/1999 | Warren et al. | |
| 5,973,731 A | 10/1999 | Schwab | |
| 5,974,141 A | 10/1999 | Saito | |
| 5,991,426 A | 11/1999 | Cox et al. | |
| 5,999,217 A | 12/1999 | Berners-Lee | |
| 6,009,176 A | 12/1999 | Gennaro et al. | |
| 6,029,126 A | 2/2000 | Malvar | |
| 6,041,316 A | 3/2000 | Allen | |
| 6,049,838 A | 4/2000 | Miller et al. | |
| 6,051,029 A | 4/2000 | Paterson et al. | |
| 6,061,793 A | 5/2000 | Tewfik et al. | |
| 6,069,914 A | 5/2000 | Cox | |
| 6,078,664 A | 6/2000 | Moskowitz et al. | |
| 6,081,251 A | 6/2000 | Sakai et al. | |
| 6,081,597 A | 6/2000 | Hoffstein et al. | |
| 6,131,162 A | 10/2000 | Yoshiura et al. | |
| 6,141,753 A | 10/2000 | Zhao et al. | |
| 6,141,754 A | 10/2000 | Choy | |
| 6,154,571 A | 11/2000 | Cox et al. | |
| 6,199,058 B1 | 3/2001 | Wong et al. | |
| 6,205,249 B1 | 3/2001 | Moskowitz | |
| 6,208,745 B1 | 3/2001 | Florenio et al. | |
| 6,230,268 B1 | 5/2001 | Miwa et al. | |
| 6,233,347 B1 | 5/2001 | Chen et al. | |
| 6,233,684 B1 | 5/2001 | Stefik et al. | |
| 6,272,634 B1 | 8/2001 | Tewfik et al. | |
| 6,275,988 B1 | 8/2001 | Nagashima et al. | |
| 6,278,780 B1 | 8/2001 | Shimada | |
| 6,278,791 B1 | 8/2001 | Honsinger et al. | |
| 6,282,300 B1 | 8/2001 | Bloom et al. | |
| 6,282,650 B1 | 8/2001 | Davis | |
| 6,285,775 B1 | 9/2001 | Wu et al. | |
| 6,310,962 B1 | 10/2001 | Chung et al. | |
| 6,330,335 B1 | 12/2001 | Rhoads | |
| 6,330,672 B1 | 12/2001 | Shur | |
| 6,351,765 B1 | 2/2002 | Pietropaolo et al. | |
| 6,373,892 B1 | 4/2002 | Ichien et al. | |
| 6,377,625 B1 | 4/2002 | Kim | |
| 6,381,618 B1 | 4/2002 | Jones et al. | |
| 6,385,329 B1 | 5/2002 | Sharma et al. | |
| 6,405,203 B1 | 6/2002 | Collart | |
| 6,415,041 B1 | 7/2002 | Oami et al. | |
| 6,425,081 B1 | 7/2002 | Iwamura | |
| 6,430,302 B2 | 8/2002 | Rhoads | |
| 6,442,283 B1 | 8/2002 | Tewfik et al. | |
| 6,453,252 B1 | 9/2002 | Laroche | |
| 6,457,058 B1 | 9/2002 | Ullum et al. | |
| 6,493,457 B1 | 12/2002 | Quackenbush | |
| 6,522,769 B1 | 2/2003 | Rhoads et al. | |
| 6,523,113 B1 | 2/2003 | Wehrenberg | |
| 6,530,021 B1 | 3/2003 | Epstein et al. | |
| 6,539,475 B1 | 3/2003 | Cox et al. | |
| 6,557,103 B1 | 4/2003 | Boncelet, Jr. et al. | |
| 6,584,125 B1 | 6/2003 | Katto | |
| 6,598,162 B1 | 7/2003 | Moskowitz | |
| 6,606,393 B1 | 8/2003 | Xie et al. | |
| 6,647,424 B1 | 11/2003 | Pearson et al. | |
| 6,665,489 B2 | 12/2003 | Collart | |
| 6,668,246 B1 | 12/2003 | Yeung et al. | |
| 6,687,683 B1 | 2/2004 | Harada et al. | |
| 6,725,372 B1 | 4/2004 | Lewis et al. | |
| 6,754,822 B1 | 6/2004 | Zhao | |
| 6,775,772 B1 | 8/2004 | Binding et al. | |
| 6,785,815 B1 | 8/2004 | Serret-Avila et al. | |
| 6,823,455 B1 | 11/2004 | Macy et al. | |
| 6,977,894 B1 | 12/2005 | Achilles et al. | |
| 6,978,370 B1 | 12/2005 | Kocher | |
| 7,007,166 B1 * | 2/2006 | Moskowitz et al. | 713/176 |
| 7,043,050 B2 | 5/2006 | Yuval | |
| 7,058,570 B1 | 6/2006 | Yu et al. | |
| 2002/0026343 A1 | 2/2002 | Duenke | |
| 2002/0097873 A1 | 7/2002 | Petrovic | |
| 2002/0103883 A1 | 8/2002 | Haverstock et al. | |
| 2003/0126445 A1 | 7/2003 | Wehrenberg | |
| 2003/0133702 A1 | 7/2003 | Collart | |
| 2004/0037449 A1 | 2/2004 | Davis et al. | |
| 2004/0128514 A1 | 7/2004 | Rhoads | |
| 2005/0160271 A9 | 7/2005 | Brundage et al. | |
| 2006/0005029 A1 | 1/2006 | Petrovic et al. | |

2006/0013395 A1  1/2006  Brundage et al.

FOREIGN PATENT DOCUMENTS

| EP | 0565947 A1 | 10/1993 |
|---|---|---|
| EP | 0581317 A2 | 2/1994 |
| EP | 0651554 A | 5/1995 |
| WO | WO 95/14289 | 5/1995 |
| WO | WO 96/29795 | 9/1996 |
| WO | WO 97/24833 | 7/1997 |
| WO | WO 98/37513 | 8/1998 |
| WO | WO 99/62044 | 12/1999 |

OTHER PUBLICATIONS

Pohlmann, Ken C., *Principles of Digital Audio*, 2nd Ed., 1991, pp. 1-9,19-25, 30-33, 41-48, 54-57, 86-107, 374-387.

Schneier, Bruce, *Applied Cryptography*, John Wiley & Sons, Inc., New York, 1994, pp. 68-69, 387-392, 1-57, 273-275, 321-324.

Buhey, et al., *Digital Watermarks for Audio Signals*, Proceedings of the International Conf. on Multimedia Computing and Systems, Jun. 17-23, 1996, Hiroshima, Japan, 0-8186-7436-9196, pp. 473-480.

Johnson, et al., *Transform Permuted Watermarking for Copyright Protection of Digital Video*, IEEE Globecom 1998, Nov. 8-12, 1998, New York, New York, vol. 2, 1998, pp. 684-689. (ISBN 0-7803-4985-7).

Rivest, et al., "PayWord and MicroMint : Two Simple Micropayment Schemes," MIT Laboratory For Computer Science, Cambridge, MA, May 7, 1996, pp. 1-18.

Rivest, et al., "Payword and Micromint: Two Simple Micropayment Schemes," MIT Laboratory For Computer Science, Cambridge, MA, Apr. 27, 2001, pp. 1-18.

Bender, etal, *Techniques For Data Hiding*, IBM Systems Journal, vol. 35, Nos. 3&4, 1996, pp. 313-336.

Moskowitz, *Bandwidth as Currency*, IEEE Multimedia, Jan.-Mar. 2003, pp. 14-21.

Moskowitz, *Multimedia Security Technologies for Digital Rights Management*, 2006, Academic Press, "Introduction—Digital Rights Management", pp. 3-22.

Tomsich, et al., "*Towards a secure and de-centralized digital watermarking infractructure for the protection of intellectual property*", in Electronic Commerce and Web Technologies, Proceedings (ECWEB 2000), Springer LNC6, vol. 1875, 2000, pp. 36-47.

Moskowitz, "What is Acceptable Quality in the Application of Digital Watermarking;" Trade-offs of Security, Robustuss and Quality, IEEE Computer Society, Proceedings of ITCL 2002, Apr. 8-10, 2002, pp. 80-84.

Lemme, et al, "*Secure Watermark Embedding through Pastel Encryption*", Individual Workshop on Digital Watermarking ("IWDW"2006), Springer Lecture putes in Computer Science, 2006, (to appear) 13 pages.

Kocher, et al., "Self Protecting Digital Content", Technical Report From the CRI Contact Security Research Initiative, Cryptography Research, Inc. 2002-2003, 14 pages.

Sirbu, M et al., "*Net Bill: An Internet Commerce System Optimized for Network Delivered Services*," Digest of Papers of the Computer Society Computer Conference (Spring), Mar. 5, 1995, pp. 20-25, vol. Conf40, Compcon, IEEE Comp. Soc. Press.

Schunter, M et al., "*A Status Report on the Semper Framework for Secure Electronic Commerce*," Computer Networks and ISON Systems, Sep. 30, 1998, pp. 1501-1510, vol. 30, No. 16-18, NL, North Holland Publishing, Amsterdam.

Konrad, K et al., "*Trust and electronic commerce—more than a technical problem*," Proceedings of the 18th IEEE Symposium on Reliable Distributed Systems, Oct. 19-22, 1999, pp. 360-365, Lausonne, Switzerland.

Kini, A. et al., "*Trust in Electronic Commerce.: Definition and Theoretical Considerations*," Proceedings of the 31st Hawaii Int'l Conf on System Sciences (Cat. No. 98TB100216), Jan. 6-9, 1998, pp. 57-61, Los Alamitos, CA, USA IEEE Comp Soc.

Steinquar, D. D. et al., "*Trust and Traceability in Electronic Commerce*," Standard View, Sep. 1997, pp. 118-124, vol. 5 No. 3, ACM, USA.

Hartung, et. al, "*Multimedia Watermarking Techniques*", Proceedings of the IEEE, Special Issue, Identification & Protection of Multimedia Information, pp. 1079-1107, Jul. 1999, vol. 87, No. 7 IEEE.

Schneier, Bruce., *Applied Cryptography*, 2nd Ed., John Wiley & Sons, pp. 9-10, 1996.

Meitezes, Alfred J., *Handbook of Applied Cryptography*, CRC Press, p. 46, 1997.

Merriam-Webster's Collegiate Dictionary, 10th Ed., Merriam Webster, Inc., p. 207, 2001.

Brealy, et al., *Principles of Corporate Finance*, "Appendix A—Using Option Valuation Models", 1984, pp. 448-449.

Copeland, et al., *Real Options: A Practioner's Guide*, 2001 pp. 106-107, 201-202, 204-208.

Sarkar, M. "An Assessment of Pricing Mechanisms For The Interact—A Regulatory Imperative", Presented MIT Workshop on Internet Economics, Mar. 1995, http://www.press.umich.edu/jep/works/SarkAssess.html on Mar. 12, 1995.

Crawford, D.W. "Pricing Network Usage—A Market For BandWidth of Market Communication?" presented MIT Workshop on Internet Economics, Mar. 1995 http://www.press.umich.edu/jep/works/CrauMarket.html on Mar. 12, 1975.

Low, S.H. "Equilibrium Allocation and Pricing of Variable Resources Among User-Suppliers", 1988, http://www.citisror.nj.nec.com/366503.html.

Caronni, Germuno, "Assuring Ownership Rights For Digital Images", published Proceedings of Reliable IT Systems, VIS '75, H.H. Bruggemann and W. Gerhardt-Hackel (Ed.), Vieweg Publishing Company, Germany, 1995.

Zhao, Jian. "A WWW Service to Embed and Prove Digital Copyright Watermarks", Proc. of the European Conf. on Multimedia Applications, Services & Techservices Louvain-La-Nevve., Belgium, May 1996.

Gruhl, Daniel et al., *Echo Hiding*, In Proceeding of the Workshop on Information Hiding, No. 1174 in Lecture Notes in Computer Science, Cambridge, England (May/Jun. 1996).

Oomen, A. W. J. et al., *A Variable Bit Rate. Buried Data Channel For Compact Disc*, J. Audio Eng. Soc., vol. 43, No. 1/2, pp. 23-28 (1995).

Ten Kate, W. et al., *A New Surround—stereo—Surround Coding Techniques*, J. Audio Eng. Soc., vol. 40, No. 5, pp. 376-383 (1992).

Gerzon, Michael et al., *A High Rate Buried Data Channel for Audio CD*, presentation notes, Audio Engineering Soc., 94th Convention (1993).

Sklar, Bernard, *Digital Communications*, pp. 601-603 (1988).

Jayant, N.S. et al., *Digital Coding of Waveforms*, Prentice Hall Inc., Englewood Cliffs, NJ, pp. 486-509 (1984).

Bender, Walter R. et al, *Techniques For Data Hiding*, SPIE Int. Soc. Opt. Eng., vol. 2420, p. 164-173, 1995.

Zhao, Jian et al., *Embedding Robust Labels Into Images For Copyright Protection*, (XP000571967), pp. 242-251, 1945.

Menezes, Alfred J., *Handbook of Applied Cryptography*, CRC Press, p. 175, 1997.

Schneier, Bruce , *Applied Cryptography*, 1stEd., pp. 67-68, 1994.

Ten Kate, W. et al., "Digital Audio Carrying Extra Information", IEEE, CH2847-2/90/0000-1097, (1990).

Van Schyndel, et al. *A digital watermark*, IEEE Int'l Computer Processing Conference, Austin, TX, Nov. 13-16, 1994, pp. 86-90.

Smith, et al. *Modulation and Information Hiding in Images*, Springer Verlag, 1st Int'l Workshop, Cambridge, UK, May 30-Jun. 1, 1996, pp. 207-227.

Kutter, Martin et al., *Digital Signature of Color Images Using Amplitude Modulation*, SPIE-E197, vol. 3022, pp. 518-527.

Puate, Juan et al., *Using Fractal Compression Scheme to Embed a Digital Signature into an Image*, SPIE-96 Proceedings, vol. 2F115, Mar. 1997, pp. 108-118.

Swanson, Mitchell D., et al., *Transparent Robust Image Watermarking*, Proc. of the 1996 IEEE Int'l Conf. On Image Processing, vol. 111, 1996, pp. 211-214.

Swanson, Mitchell D., et al., *Robust Data Hiding For Images*, 7th IEEE Digital Signal Processing Workshop, Leon, Norway, Sep. 1-4, 1996, pp. 37-40.

Zhao, Jian, et al., *Embedding Robust Labels into Images for Copyright Protection*, Proceedings of the Know Right '95 Conference, pp. 242-251.

Koch, E, et al., *Towards Robust and Hidden Image Copyright Labeling*, 1995 IEEE Workshop on Nonlinear Signal and Image Processing, Jun. 1995, Neos Marmaras, pp. 4.

Van Schyndel, et al., *Towards a Robust Digital Watermark*, Second Asian Image Processing Conference, Dec. 6-8, 1995, Singapore, vol. 2, pp. 504-505.

Tirkel, A.Z., *A Two-Dimensional Digital Watermark*, DICTA '95, Univ. of Queensland, Brisbane, Dec. 5-8, 1995, pp. 7.

Tirkel, A. Z., *Image Watermarking—A Spread Spectrum Application*, I.SSSTA '96, Sep. 96, Mainz, German, pp. 6.

O'Ruanaidh et al. *Watermarking Digital Images for Copyright Protection*, IEE Proceedings, vol. 143, No. 4, Aug. 96, pp. 250-256.

Cox, et al, *Secure Spread Spectrum Watermarking For Multimedia*, NEC Research Institute, Technical Report A5-10, pp. 33. 1995.

Kahn, D., *The Code Breakers*, The MacMillan Company, 1969, pp. X111, 81-83, 513, 515, 522-526, 863.

Bailey, et al., *Digital Watermarks For Audio Signals*, EUSIPCO,96, pp. 473-480.

Dept. of Electrical Engineering, Delft University of Technology, Delft, The Netherlands, Cr.C. Langelaar et al., *Copy Protection For Multimedia Data based on Labeling Techniques*, Jul. 1996, a pp.

F. Hartung, et al., *Digital Watermarking of Raw and Compressed Video*, SPIE vol. 2952, pp. 205-213, 1996.

Craver, et al., *Can Invisible Watermarks Resolve Rightful Ownership?* IBM Research Report, RC 20509 (Jul. 25, 1996) 21 pp.

Press, et al., *Numerical Recipes Inc*, Cambridge Univ. Press, 1988, pp. 398-417.

\* cited by examiner

METHOD AND SYSTEM FOR DIGITAL WATERMARKING

CROSS REFERENCE TO RELATED APPLICATIONS

This application is a continuation of U.S. patent application Ser. No. 09/545,589, filed Apr. 7, 2000, now U.S. Pat. No. 7,007,166, which is a continuation of U.S. patent application Ser. No. 08/674,726, filed Jul. 2, 1996. The previously identified patents and/or patent applications are hereby incorporated by reference, in their entirety.

RELATED APPLICATIONS

This application is related to patent applications entitled "Steganographic Method and Device", Ser. No. 08/489,172 filed Jun. 7, 1995 (issued as U.S. Pat. No. 5,613,004 on Mar. 18, 1997); "Method for Human-Assisted Random Key Generation and Application for Digital Watermark System", Ser. No. 08/587,944 filed on Jan. 17, 1996 (issued as U.S. Pat. No. 5,822,432 on Oct. 13, 1998); "Method for Stega-Cipher Protection of Computer Code", Ser. No. 08/587,943 filed on Jan. 17, 1996 (issued as U.S. Pat. No. 5,745,569 on Apr. 28, 1997); "Digital Information Commodities Exchange", Ser. No. 08/365,454 filed on Dec. 28, 1994 (issued as U.S. Pat. No. 5,539,735 on Jul. 23, 1996) which is a continuation of Ser. No. 08/083,593 filed on Jun. 30, 1993 (issued as U.S. Pat. No. 5,428,606 on Jun. 27, 1995); and "Optimization Methods For The Insertion, Protection, and Detection of Digital Watermarks in Digital Data", Ser. No. 08/677,435, filed on Jul. 2, 1996 (issued as U.S. Pat. No. 5,889,868 on Mar. 30, 1999). These related applications are all incorporated herein by reference.

This application is also related to U.S. Pat. No. 5,428,606, "Digital Information Commodities Exchange", issued on Jun. 27, 1995, which is incorporated herein by reference.

BACKGROUND OF THE INVENTION

Digital watermarks exist at a convergence point where creators and publishers of digitized multimedia content demand localized, secured identification and authentication of that content. Because piracy is clearly a disincentive to the digital distribution of copyrighted content, establishment of responsibility for copies and derivative copies of such works is invaluable. It is desirable to tie copyrights, ownership rights, purchaser information or some combination of these and related data into the content in such a manner that the content must undergo damage, and therefore reduction of its value, in order to remove such data for the purpose of subsequent, unauthorized distribution, commercial or otherwise. Legal precedent or attitudinal shifts recognizing the importance of digital watermarks as a necessary component of commercially-distributed content (audio, video, game, etc.) will further the development of acceptable parameters for the exchange of such content by the various parties engaged in such activities. These may include artists, engineers, studios, INTERNET access providers, publishers, agents, on-line service providers, aggregators of content for some form of electronic delivery, on-line retailers, individuals and other related parties that participate in the transfer of funds or arbitrate the actual delivery of content to intended recipients.

There are a number of hardware and software approaches that attempt to provide protection of multimedia content, including encryption, cryptographic containers, cryptographic envelopes or "cryptolopes," and trusted systems in general. None of these systems places control of copyrights in the hands of the content creator as content is created. Further, none of these systems provide an economically feasible model for the content to be exchanged with its identification embedded within the signals that comprise the content. Given the existence of over 100 million personal computers and many more non-copyright-protected consumer electronic goods (such as audio clips, still pictures and videos), copyrights are most suitably placed within the digitized signals. Playing content is necessary to determine or "establish" its commercial value. Likewise, advertising and broadcast of samples or complete works reinforces demand for the content by making its existence known to market participants (via radio, television, print media or even the INTERNET).

Generally, encryption and cryptographic containers serve copyright holders as a means to protect data in transit between a publisher or distributor and the purchaser of the data. That is, a method of securing the delivery of copyrighted material from one location to another by using variations of public key cryptography or other cryptosystems. Cryptolopes are suited specifically for copyrighted text that is time sensitive, such as newspapers, where intellectual property rights and origin are made a permanent part of the file.

The basis for public key cryptography is provided, for example, in a number of patented inventions. Information on public-key cryptosystems can be obtained from U.S. Pat. No. 4,200,770 to Hellman et al., U.S. Pat. No. 4,218,582 to Hellman et al., U.S. Pat. No. 4,405,829 to Riverst et al., and U.S. Pat. No. 4,424,414 to Hellman et al. Digitally-sampled copyrighted material is a special case because of its long term value coupled with the ease and perfection in creating copies and transmitting by general purpose computing and telecommunications devices. In this special case of digitally-sampled material, there is no loss of quality in derivative works and no identifiable differences between one copy and any other subsequent copy.

For creators of content, distribution costs may be minimized with electronic transmission of copyrighted works. Unfortunately, seeking some form of informational or commercial return via electronic exchange is ill-advised, absent the establishment of responsibility of specific copies or instances of copies or some form of trusted system in general.

FIELD OF INVENTION

The present invention is related to a method and system for applying a digital watermark to a content signal.

With the advent of computer networks and digital multimedia, protection of intellectual property has become a prime concern for creators and publishers of digitized copies of copyrightable works, such as musical recordings, movies, and video games. One method of protecting copyrights in the digital domain is to use "digital watermarks". Digital watermarks can be used to mark each individual copy of a digitized work with information identifying the title, copyright holder, and even the licensed owner of a particular copy. The watermarks can also serve to allow for secured metering and support of other distribution systems of given media content and relevant information associated with them, including addresses, protocols, billing, pricing or distribution path parameters, among the many things that could constitute a "watermark." For further discussion of systems that are oriented around content-based addresses and directories, see U.S. Pat. No. 5,428,606 Moskowitz. When marked with licensing and ownership information, responsibility is created for individual copies where before there was none. More information on digital watermarks is set forth in "Steganographic Method and Device"—The DICE Company, U.S. application Ser. No. 08/489,172, the disclosure of which is hereby incorporated by reference. Also, "Technology: Digital Commerce", Denise Caruso, New York Times, Aug. 7, 1995 "Copyrighting in the Information Age", Harley Ungar, ONLINE MARKETPLACE, September 1995, Jupiter Communications further describe digital watermarks.

Additional information on other methods for hiding information signals in content signals is disclosed in U.S. Pat. No. 5,319,735—Preuss et al. and U.S. Pat. No. 5,379,345—Greenberg.

Digital watermarks can be encoded with random or pseudo-random keys, which act as secret maps for locating the watermarks. These keys make it impossible for a party without the key to find the watermark—in addition, the encoding method can be enhanced to force a party to cause damage to a watermarked data stream when trying to erase a random-key watermark.

It is desirable to be able to specify limitations on the application of such random or pseudo-random keys in encoding a watermark to minimize artifacts in the content signal while maximizing encoding level. This preserves the quality of the content, while maximizing the security of the watermark. Security is maximized because erasing a watermark without a key results in the greatest amount of perceptible artifacts in the digital content. It is also desirable to separate the functionality of the decoder side of the process to provide fuller recognition and substantiation of the protection of goods that are essentially digitized bits, while ensuring the security of the encoder and the encoded content. It is also desirable that the separate decoder be incorporated into an agent, virus, search engine, or other autonomously operating or search function software. This would make it possible for parties possessing a decoder to verify the presence of valid watermarks in a data stream, without accessing the contents of the watermark. It would also be possible to scan or search archives for files containing watermarked content, and to verify the validity of the presence of such files in an archive, by means of the information contained in the watermarks. This scenario has particular application in screening large archives of files kept by on-line services and internet archives. It is further a goal of such processes to bring as much control of copyrights and content, including its pricing, billing, and distribution, to the parties that are responsible for creating and administering that content. It is another goal of the invention to provide a method for encoding multiple watermarks into a digital work, where each watermark can be accessed by use of a separate key. This ability can be used to provide access to watermark information to various parties with different levels of access. It is another goal of the invention to provide a mechanism which allows for accommodation of alternative methods encoding and decoding watermarks from within the same software or hardware infrastructure. This ability can be used to provide upgrades to the watermark system, without breaking support for decoding watermarks created by previous versions of the system. It is another goal of the invention to provide a mechanism for the certification and authentication, via a trusted third party, and public forums, of the information placed in a digital watermark. This provides additional corroboration of the information contained in a decoded digital watermark for the purpose of its use in prosecution of copyright infringement cases. It also has use in any situation in which a trusted third party verification is useful. It is another goal of this invention to provide an additional method for the synchronization of watermark decoding software to an embedded watermark signal that is more robust than previously disclosed methods.

SUMMARY OF THE INVENTION

The invention described herein is a human-assisted random key generation and application system for use in a digital watermark system. The invention allows an engineer or other individual, with specialized knowledge regarding processing and perception of a particular content type, such as digital audio or video, to observe a graphical representation of a subject digital recording or data stream, in conjunction with its presentation (listening or viewing) and to provide input to the key generation system that establishes a key generation "envelope", which determines how the key is used to apply a digital watermark to the digital data stream. The envelope limits the parameters of either or both the key generation system and the watermark application system, providing a rough guide within which a random or pseudo-random key may be automatically generated and applied. This can provide a good fit to the content, such that the key may be used to encode a digital watermark into the content in such a manner as to minimize or limit the perceptible artifacts produced in the watermarked copy, while maximizing the signal encoding level. The invention further provides for variations in creating, retrieving, monitoring and manipulating watermarks to create better and more flexible approaches to working with copyrights in the digital domain.

Such a system is described herein and provides the user with a graphical representation of the content signal over time. In addition, it provides a way for the user to input constraints on the application of the digital watermark key, and provides a way to store this information with a random or pseudo-random key sequence which is also generated to apply to a content signal. Such a system would also be more readily adaptable by current techniques to master content with personal computers and authoring/editing software. It would also enable individuals to monitor their copyrights with decoders to authenticate individual purchases, filter possible problematic and unpaid copyrightable materials in archives, and provide for a more generally distributed approach to the monitoring and protection of copyrights in the digital domain.

The present invention allows the establishing of responsibility of specific copies or instances of copies using digital watermarks.

The present inventions relates to methods for the management and distribution of digital watermark keys (e.g., private, semiprivate and public) and the extension of information associated with such keys in order to create a mechanism for the securitization of multimedia titles to which the keys apply.

The present invention additionally relates to "distributed" keys to better define rights that are traded between transacting parties in exchanging information or content.

The present invention additionally provides improvements in using digital watermark information. For example, the speed of performing a key search for watermarks within content is increased. Additionally, more than one party can cooperate in adding distinguished watermarks at various stages of distribution without destroying watermarks previously placed in the content.

Digital watermarks make possible more objective commercial exchanges of content. Trusted systems are more costly but achieve the same goal by establishing the identity of all electronic exchange participants. Digital watermark per copy systems, however, are not on a simple level of establishing responsibility of a master work and its derivative copy only. Multichannel watermarks with private, semiprivate and public keys used as different levels of neighboring rights assist in the creation of a self-contained model for the exchange of copyrighted works. Private key watermarks can be inserted into content to establish ownership rights (copyright, master right, etc.) with the content creator or an agent of the content creator maintaining control over the key. Semiprivate watermark keys can exist in a separate channel of the information signals that make up the work to be exchanged for subsequently delegating responsibility to distributors or sales entities to restrict resale rights in the same manner that physical goods have an exchange of title corresponding to their sale. And finally, public watermark keys exist as an independent component of the identification, authentication or advertising of a given work to be widely distributed over networks for initiating the purchase of a sought-after work. The market will still rely upon trusted parties who report any distribution or exchange of derivative watermarked copies of these "protected" works. Recognition of copyrights as well as the desire to prevent piracy is a fundamental motive of enforcement which uses the mechanism of digital watermarks to alleviate fears of copyright holders and transacting parties that responsibility and payment for copyrights cannot be accomplished.

A necessity has arisen for a system that better defines methods for recognizing these rights and, with the further creation of bandwidth rights, as in the present invention, makes possible a distributed model for digital distribution of content which combines the security of a digital watermark system with efficient barter mechanisms for handling the actual delivery of digital goods.

The present invention relates to methods for the management and distribution of digital watermark keys (e.g., private, semiprivate and public) and the extension of information associated with such keys in order to create a mechanism for the securitization of multimedia titles to which the keys apply. To differentiate the present invention from the art of public key cryptography, use of "private," "semiprivate," and "public" keys refers only to the use of such "information" with the stated purpose of distributing goods and watermarking content, not encryption or cryptography in the general sense.

The present invention additionally relates to "distributed" keys to better define rights that are traded between transacting parties in exchanging information or content. Such keys can carry additional pricing and timing information, and represent coupons, warrants or similar financial instruments for purchase of copies of the corresponding title at particular prices within a specified period of time. These instruments, as extended keys, could be collected on servers, distributed to individuals and redeemed as part of a transaction to purchase the content. The basis for this type of content trading system is described in U.S. Pat. No. 5,428,606 entitled "Digital Information Commodities Exchange" (hereinafter, also referred to as "the DICE patent"). The present invention improves on the invention described in the DICE patent by integrating into the DICE exchange (i.e., The Digital Information Commodities Exchange) the copyright protection mechanisms of digital watermarks. Digital watermarks are described in the following patent applications assigned to The DICE Company: "Steganographic Method and Device", Ser. No. 08/489,172 (issued as U.S. Pat. No. 5,613,004 on Mar. 18, 1997); "Method for Stega-Cipher Protection of Computer Code", Ser. No. 08/587,943 (issued as U.S. Pat. No. 5,745,569 on Apr. 28, 1998); "Method for Human Assisted Random Key Generation and Application for Digital Watermark System", Ser. No. 08/587,944 (issued as U.S. Pat. No. 5,822,432 on Oct. 13, 1998); and "Optimization Methods For The Insertion, Protection, and Detection of Digital Watermarks in Digitized Data", Ser. No. 08/677,435 filed on Jul. 2, 1996 (issued as U.S. Pat. No. 5,889,868 on Mar. 30, 1999).

In addition, the present invention improves upon the techniques of digital watermark systems, described in the patent applications listed above, by adding methods for the use of this information which allow for improvements in the speed of performing a key search for watermarks within content, and by allowing for more than one party to cooperate in adding distinguished watermarks at various stages of distribution without destroying watermarks previously placed in the content. At the same time, these methods minimize the amount of information which any one party must divulge to another party, and prevent "downstream" parties from compromising or otherwise gaining control of watermarks embedded by "upstream" parties.

Further improvements of the present invention include the incorporation of retail models using well-known commodities exchanges to accomplish more efficient means of advertising, negotiating, and delivering digital goods in an anonymous marketplace as commonly characterized by such systems as the INTERNET. Video-on-demand models, quality of service reservations considered in subscriber models, and related models that have been referred to as "time shares" for parceling up processing time in a general computing network will also be differentiated.

DETAILED DESCRIPTION

Digital watermarks are created by encoding an information signal into a larger content signal. The information stream is integral with the content stream, creating a composite stream. The effectiveness and value of such watermarks are highest when the informational signal is difficult to remove, in the absence of the key, without causing perceptible artifacts in the content signal. The watermarked content signal itself should contain minimal or no perceptible artifacts of the information signal. To make a watermark virtually impossible to find without permissive use of the key, its encoding is dependent upon a randomly generated sequence of binary 1s and 0s, which act as the authorization key. Whoever possesses this key can access the watermark. In effect, the key is a map describing where in the content signal the information signal is hidden. This represents an improvement over existing efforts to protect copyrightable material through hardware-based solutions always existing outside the actual content. "Antipiracy" devices are used in present applications like VCRs, cable television boxes, and digital audio tape (DAT) recorders, but are quite often disabled by those who have some knowledge of the location of the device or choose not to purchase hardware with these "additional security features." With digital watermarks, the "protection," or more accurately, the deterrent, is hidden entirely in the signal, rather than a particular chip in the hardware.

Given a completely random key, which is uniformly applied over a content signal, resulting artifacts in the watermarked content signal are unpredictable, and depend on the interaction of the key and the content signal itself. One way to ensure minimization of artifacts is to use a low information signal level. However, this makes the watermark easier to erase, without causing audible artifacts in the content signal. This is a weakness. If the information signal level is boosted, there is the risk of generating audible artifacts.

The nature of the content signal generally varies significantly over time. During some segments, the signal may lend itself to masking artifacts that would otherwise be caused by high level encoding. At other times, any encoding is likely to cause artifacts. In addition, it might be worthwhile to encode low signal level information in a particular frequency range which corresponds to important frequency components of the content signal in a given segment of the content signal. This would make it difficult to perform bandpass filtering on the content signal to remove watermarks.

Given the benefits of such modifications to the application of the random key sequence in encoding a digital watermark, what is needed is a system which allows human-assisted key generation and application for digital watermarks. The term "human-assisted key generation" is used because in practice, the information describing how the random or pseudo-random sequence key is to be applied must be stored with the key sequence. It is, in essence, part of the key itself, since the random or pseudo-random sequence alone is not enough to encode, or possibly decode the watermark.

Encoding of digital watermarks into a content signal can be done in the time domain, by modifying content samples on a sample by sample basis, or in the frequency domain, by first performing a mathematical transform on a series of content samples in order to convert them into frequency domain information, subsequently modifying the frequency domain information with the watermark, and reverse transforming it back into time-based samples. The conversion between time and frequency domains can be accomplished by means of any of a class of mathematical transforms, known in general as "Fourier Transforms." There are various algorithmic implementations and optimizations in computer source code to enable computers to perform such transform calculations. The frequency domain method can be used to perform "spread spectrum" encoding implementations. Spread spectrum techniques are described in the prior art patents disclosed. Some of the shortcomings evident in these techniques relate to the fixed parameters for signal insertion in a sub audible level of the frequency-based domain, e.g., U.S. Pat. No. 5,319,735 Preuss et al. A straightforward randomization attack may be engaged to remove the signal by simply over-encoding random information continuously in all sub-bands of the spread spectrum signal band, which is fixed and well defined. Since the Preuss patent relies on masking effects to render the watermark signal, which is encoded at −15 dB relative to the carrier signal, inaudible, such a randomization attack will not result in audible artifacts in the carrier signal, or degradation of the content. More worrisome, the signal is not the original but a composite of an actual frequency in a known domain combined with another signal to create a "facsimile" or approximation, said to be imperceptible to a human observer, of the original copy. What results is the forced maintenance of one original to compare against subsequent "suspect" copies for examination. Human-assisted watermarking would provide an improvement over the art by providing flexibility as to where information signals would be inserted into content while giving the content creator the ability to check all subsequent copies without the requirement of a single original or master copy for comparison. Thus the present invention provides for a system where all necessary information is contained within the watermark itself.

Among other improvements over the art, generation of keys and encoding with human assistance would allow for a better match of a given informational signal (be it an ISRC code, an audio or voice file, serial number, or other "file" format) to the underlying content given differences in the make-up of the multitudes of forms of content (classical music, CD-ROM versions of the popular game DOOM, personal HTML Web pages, virtual reality simulations, etc.) and the ultimate wishes of the content creator or his agents. This translates into a better ability to maximize the watermark signal level, so as to force maximal damage to the content signal when there is an attempt to erase a watermark without the key. For instance, an engineer could select only the sections of a digital audio recording where there were high levels of distortion present in the original recording, while omitting those sections with relatively "pure" components from the watermark process. This then allows the engineer to encode the watermark at a relatively higher signal level in the selected sections without causing audible artifacts in the signal, since the changes to the signal caused by the watermark encoding will be masked by the distortion. A party wanting to erase the watermark has no idea, however, where or at what level a watermark is encoded, and so must choose to "erase" at the maximum level across the entire data stream, to be sure they have obliterated every instance of a watermark.

In the present invention, the input provided by the engineer is directly and immediately reflected in a graphical representation of content of that input, in a manner such that it is overlaid on a representation of the recorded signal. The key generation "envelope" described by the engineer can be dictated to vary dynamically over time, as the engineer chooses. The graphical representation of the content is typically rendered on a two dimensional computer screen, with a segment of the signal over time proceeding horizontally across the screen. The vertical axis is used to distinguish various frequency bands in the signal, while the cells described by the intersection of vertical and horizontal unit lines can signify relative amplitude. values by either a brightness or a color value on the display.

Another possible configuration and operation of the system would use a display mapping time on the horizontal axis versus signal amplitude on the vertical axis. This is particularly useful for digital audio signals. In this case, an engineer could indicate certain time segments, perhaps those containing a highly distorted signal, to be used for watermark encoding, while other segments, which contain relatively pure signals, concentrated in a few bandwidths, may be exempt from watermarking. The engineer using a time vs. amplitude assisted key generation configuration would generally not input frequency limiting information.

In practice, the system might be used by an engineer or other user as follows:

The engineer loads a file containing the digitized content stream to be watermarked onto a computer. The engineer runs the key generation application and opens the file to be watermarked. The application opens a window which contains a graphical representation of the digitized samples. Typically, for digital audio, the engineer would see a rectangular area with time on the horizontal axis, frequency bands on the vertical axis, and varying color or brightness signifying signal power at a particular time and frequency band. Each vertical slice of the rectangle represents the frequency components, and their respective amplitude, at a particular instant ("small increment") of time. Typically, the display also provides means for scrolling from one end of the stream to the other if it is too long to fit on the screen, and for zooming in or out magnification in time or frequency. For the engineer, this rectangular area acts as a canvas. Using a mouse and/or keyboard, the engineer can scroll through the signal slowly marking out time segments or frequency band minima and maxima which dictate where, at what frequencies, and at what encoding signal level a watermark signal is to be encoded into the content, given a random or pseudo-random key sequence. The engineer may limit these marks to all, none or any of the types of information discussed above. When the engineer is finished annotating the content signal, he or she selects a key generation function. At this point, all the annotated information is saved in a record and a random or pseudo-random key sequence is generated associated with other information. At some later point, this combined key record can be used to encode and/or decode a watermark into this signal, or additional instances of it.

A suitable pseudo-random binary sequence for use as a key may be generated by: collecting some random timing information based on user keystrokes input to a keyboard device attached to the computer, performing a secure one way hash operation on this random timing data, using the results of the hash to seed a block cipher algorithm loop, and then cycling the block cipher and collecting a sequence of 1s and 0s from the cipher's output, until a pseudo-random sequence of 1s and 0s of desired length is obtained.

The key and its application information can then be saved together in a single database record within a database established for the purpose of archiving such information, and sorting and accessing it by particular criteria. This database should be encrypted with a passphrase to prevent the theft of its contents from the storage medium.

Another improvement in the invention is support for alternate encoding algorithm support. This can be accomplished for any function which relates to the encoding of the digital watermark by associating with the pseudo-random string of 1s and 0s comprising the pseudo-random key, a list of references to the appropriate functions for accomplishing the encoding. For a given function, these references can indicate a particular version of the function to use, or an entirely new one. The references can take the form of integer indexes which reference chunks of computer code, of alphanumeric strings which name such "code resources," or the memory address of the entry point of a piece of code already resident in computer memory. Such references are not, however, limited to the above examples. In the implementation of software, based on this and previous filings, each key contains associated references to functions identified as CODEC—basic encode/decode algorithm which encodes and decodes bits of information directly to and from the content signal, MAP—a function which relates the bits of the key to the content stream, FILTER—a function which describes how to pre-filter the content signal, prior to encoding or decoding, CIPHER—a function which provides encryption and decryption services for information contained in the watermark, and ERRCODE—a function which further encodes/decodes watermark information so that errors introduced into a watermark may be corrected after extraction from the content signal.

Additionally, a new method of synchronizing decoder software to an embedded watermark is described. In a previous disclosure, a method whereby a marker sequence of N random bits was generated, and used to signal the start of an encoded watermark was described. When the decoder recognizes the N bit sequence, it knows it is synchronized. In that system the chance of a false positive synchronization was estimated at $1/(N^2)$ ("one over (N to the power of 2)"). While that method is fairly reliable, it depends on the marker being encoded as part of the steganographic process, into the content stream. While errors in the encoded bits may be partially offset by error coding techniques, error coding the marker will require more computation and complexity in the system. It also does not completely eliminate the possibility that a randomization attack can succeed in destroying the marker. A new method is implemented in which the encoder pre-processes the digital sample stream, calculating where watermark information will be encoded. As it is doing this, it notes the starting position of each complete watermark, and records to a file, a sequence of N-bits representing sample information corresponding to the start of the watermark, for instance, the 3rd most significant bit of the 256 samples immediately preceding the start of a watermark. This would be a 256 bit marker. The order in which these markers are encountered is preserved, as it is important. The decoder then searches for matches to these markers. It processes the markers from first to last, discarding each as it is found, or possibly not found within a certain scanning distance, and proceeding with the remaining markers. This method does not modify the original signal with marker information and has the added benefit that high-significance sequences can be used, requiring that an attack based on randomizing markers do very obvious damage to the content stream.

With multichannel encoding, both private and public keys, similar in use to those from public-key cryptosystems, could be provided for authentication by concerned third party vendors and consumers, as well as contribute to better management and protection of copyrights for the digital world that already exist in the physical world. For more information on public-key cryptosystems see U.S. Pat. No. 4,200,770 Diffie-Hellman, U.S. Pat. No. 4,218,582 Hellman, U.S. Pat. No. 4,405,829 RSA, U.S. Pat. No. 4,424,414 Hellman Pohlig. In addition, any number of key "designations" between "public" and "private" could be established, to provide various access privileges to different groups. Multi-channel watermarks are effected by encoding separate watermark certificates with separate keys by either interleaving windows in the time domain or by using separate frequency bands in the frequency domain. For instance, 3 separate watermarks could be encoded by using every third sample window processed to encode a corresponding certificate. Alternatively, complete watermarks could be interleaved. Similarly, the frequency range of an audio recording might be partitioned into 3 sub-ranges for such a purpose. Use of multi-channel watermarks would allow groups with varying access privileges to access watermark information in a given content signal. The methods of multichannel encoding would further provide for more holographic and inexpensive maintenance of copyrights by parties that have differing levels of access priority as decided by the ultimate owner or publisher of the underlying content. Some watermarks could even play significant roles in adhering to given filtering (for example, content that is not intended for all observers), distribution, and even pricing schemes for given pieces of content. Further, on-the-fly watermarking could enhance identification of pieces of content that are traded between a number of parties or in a number of levels of distribution. Previously discussed patents by Preuss et al. and Greenberg and other similar systems lack this feature.

Further improvements over the prior art include the general capacity and robustness of the given piece of information that can be inserted into media content with digital watermarks, described in Steganographic Method and Device and further modified here, versus "spread spectrum-only" methods. First, the spread spectrum technique described in U.S. Pat. No. 5,319,735 Preuss et al. is limited to an encoding rate of 4.3 8-bit symbols per second within a digital audio signal. This is because of the nature of reliability requirements for spread spectrum systems. The methods described in this invention and those of the previous application, "Steganographic Method and Device," do not particularly adhere to the use of such spread spectrum techniques, thus removing such limitation. In the steganographic derived implementation the inventors have developed based on these filings, watermarks of approximately 1,000 bytes (or 1000.times.8 bits) were encoded at a rate of more than 2 complete watermarks per second into the carrier signal. The carrier signal was a two channel (stereo) 16-bit, 44.1 Khz recording. The cited encoding rate is per channel. This has been successfully tested in a number of audio signals. While this capacity is likely to decrease by 50% or more as a result of future improvements to the security of the system, it should still far exceed the 4.3 symbols per second envisioned by Preuss et al. Second, the ability exists to recover the watermarked information with a sample of the overall piece of digitized content (that is, for instance, being able to recover a watermark from just 10 seconds of a 3 minute song, depending on the robustness or size of the data in a given watermark) instead of a full original. Third, the encoding process described in Steganographic Method and Device and further modified in this invention explicitly seeks to encode the information signal in such a way with the underlying content signal as to make destruction of the watermark cause destruction of the underlying signal. The prior art describes methods that confuse the outright destruction of the underlying content with "the level of difficulty" of removing or altering information signals that may destroy underlying content. This invention anticipates efforts that can be undertaken with software, such as Digidesign's Sound Designer II or Passport Design's Alchemy, which gives audio engineers (similar authoring software for video also exists, for instance, that sold by Avid Technology, and others as well as the large library of picture authoring tools) very precise control of digital signals, "embedded" or otherwise, that can be purely manipulated in the frequency domain. Such software provides for bandpass filtering and noise elimination options that may be directed at specific ranges of the frequency domain, a ripe method for attack in order to hamper recovery of watermark information encoded in specific frequency ranges.

Separating the decoder from the encoder can limit the ability to reverse the encoding process while providing a reliable method for third parties to be able to make attempts to screen their archives for watermarked content without being able to tamper with all of the actual watermarks. This can be further facilitated by placing separate signals in the content using the encoder, which signal the presence of a valid watermark, e.g. by providing a "public key accessible" watermark channel which contains information comprised of a digitally signed digital notary registration of the watermark in the private channel, along with a checksum verifying the content stream. The checksum reflects the unique nature of the actual samples which contain the watermark in question, and therefore would provide a means to detect an attempt to graft a watermark lifted from one recording and placed into another recording in an attempt to deceive decoding software of the nature of the recording in question. During encoding, the encoder can leave room within the watermark for the checksum, and analyze the portion of the content stream which will contain the watermark in order to generate the checksum before the watermark is encoded. Once the checksum is computed, the complete watermark certificate, which now contains the checksum, is signed and/or encrypted, which prevents modification of any portion of the certificate, including the checksum, and finally encoded into the stream. Thus, if it is somehow moved at a later time, that fact can be detected by decoders. Once the decoder functions are separate from the encoder, watermark decoding functionality could be embedded in several types of software including search agents, viruses, and automated archive scanners. Such software could then be used to screen files or search out files from archive which contain specific watermark information, types of watermarks, or lack watermarks. For instance, an online service could, as policy, refuse to archive any digital audio file which does not contain a valid watermark notarized by a trusted digital notary. It could then run automated software to continuously scan its archive for digital audio files which lack such watermarks, and erase them.

Watermarks can be generated to contain information to be used in effecting software or content metering services. In order to accomplish this, the watermark would include various fields selected from the following information:

title identification;

unit measure;

unit price;

percentage transfer threshold at which liability is incurred to purchaser;

percent of content transferred;

authorized purchaser identification;

seller account identification;

payment means identification;

digitally signed information from sender indicating percent of content transferred; and digitally signed information from receiver indicating percent of content received.

These "metering" watermarks could be dependent on a near continuous exchange of information between the transmitter and receiver of the metered information in question. The idea is that both sides must agree to what the watermark says, by digitally signing it. The sender agrees they have sent a certain amount of a certain title, for instance, and the receiver agrees they have received it, possibly incurring a liability to pay for the information once a certain threshold is passed. If the parties disagree, the transaction can be discontinued before such time. In addition, metering watermarks could contain account information or other payment information which would facilitate the transaction.

Watermarks can also be made to contain information pertaining to geographical or electronic distribution restrictions, or which contain information on where to locate other copies of this content, or similar content. For instance, a watermark might stipulate that a recording is for sale only in the United States, or that it is to be sold only to persons connecting to an online distribution site from a certain set of internet domain names, like ".us" for United States, or ".ny" for New York. Further a watermark might contain one or more URLs describing online sites where similar content that the buyer of a piece of content might be interested in can be found.

A digital notary could also be used in a more general way to register, time stamp and authenticate the information inside a watermark, which is referred to as the certificate. A digital notary processes a document which contains information and assigns to it a unique identification number which is a mathematical function of the contents of the document. The notary also generally includes a time stamp in the document along with the notary's own digital signature to verify the date and time it received and "notarized" the document. After being so notarized, the document cannot be altered in any way without voiding its mathematically computed signature. To further enhance trust in such a system, the notary may publish in a public forum, such as a newspaper, which bears a verifiable date, the notarization signatures of all documents notarized on a given date. This process would significantly enhance the trust placed in a digital watermark extracted for the purpose of use in settling legal disputes over copyright ownership and infringement.

Other "spread spectrum" techniques described in the art have predefined time stamps to serve the purpose of verifying the actual time a particular piece of content is being played by a broadcaster, e.g., U.S. Pat. No. 5,379,345 Greenberg, not the insertion and control of a copyright or similar information (such as distribution path, billing, metering) by the owner or publisher of the content. The Greenberg patent focuses almost exclusively on concerns of broadcasters, not content creators who deal with digitized media content when distributing their copyrightable materials to unknown parties. The methods described are specific to spread spectrum insertion of signals as "segment timing marks" to make comparisons against a specific master of the underlying broadcast material—again with the intention of specifying if the broadcast was made according to agreed terms with the advertisers. No provisions are made for stamping given audio signals or other digital signals with "purchaser" or publisher information to stamp the individual piece of content in a manner similar to the sales of physical media products (CDs, CD-ROMs, etc.) or other products in general (pizza delivery, direct mail purchases, etc.). In other words, "intervaldefining signals," as described in the Greenberg patent, are important for verification of broadcasts of a time-based commodity like time and date-specific, reserved broadcast time, but have little use for individuals trying to specify distribution paths, pricing, or protect copyrights relating to given content which may be used repeatedly by consumers for many years. It would also lack any provisions for the "serialization" and identification of individual copies of media content as it can be distributed or exchanged on the Internet or in other on-line systems (via telephones, cables, or any other electronic transmission media). Finally, the Greenberg patent ties itself specifically to broadcast infrastructure, with the described encoding occurring just before transmission of the content signal via analog or digital broadcast, and decoding occurring upon reception.

There are several issues preventing greater volumes of electronic distribution of multimedia content. While such distribution is in fact technically feasible at the present time, attempts at commercially-viable systems are still plagued by these problems, and render digital multimedia exchanges unsatisfactory on a scale comparable to mass retailing in consumer goods markets, such as that of digital audio recordings on compact discs (CDs). So, while it is possible to transmit a single copy of a digital recording, as 16-bit 44.1 kHz stereo (CD-quality), to an individual from an archive, making such copies available to a large number of paying consumers on demand is still not yet being implemented. The problems fall into several classes—distribution bandwidth, copyright protection, technological complexities, and "efficient shopping."

In a similar vein to distribution of physical goods in the real world, bandwidth and developments that in effect increase bandwidth are creating profound new business models in how content creators and publishers can distribute their works. From the simplest compression schemes, to actual use of "wired" technology including ISDN, cable modems, ATM, and fiber optic lines, the trend is to greater amounts of bandwidth available to on-line users. It is a conundrum of the digital age that the object of bandwidth use will most likely require downloads of copyrighted works, or transaction-based models, to justify such increases in bandwidth availability. The actual works sought exist as a predefined set of protocols or standards that, when adhered to by hardware or software, can be played back flawlessly many times over. Such works include 74 minute CDs and 300 MB CD-ROMs, among the many physical transport media that now exist. However, the actual digital signals that make up the audio or video clip are not dependent on new playback standards or PC playback software. Simply put, "clips" do not need additional steps to be played back. The signals that a CD carries are not dependent on the CD for its commercial value and could just as easily be carried on a DAT, Minidisc, DVD or any other physical medium that can carry audio signals (for example) in a format of 44.1 kHz and 16 bits ("CD quality"). The most apparent drawback is that CDs are not recordable mediums, like cassettes or the above mentioned mediums, so that they are not as economical when coupled with prevalent recording devices such as DAT recorders, PC hard drives, DVD recorders, etc., or when coupled with the advent of electronic lines or "pipes" to the home.

Compression can be both lossless and lossy and has an effect on how a given piece of content can be commercially-valued in the marketplace. Physical goods pricing can be thought of similarly with cassette tapes and CDs which trade at divergent values because of audio quality and degradation, or lack thereof, of such quality over time. Although manufacturing costs of CDs are lower than cassettes, CDs are actually more expensive than cassettes in the marketplace. Presumably a premium is placed on the quality of the stored content, music or otherwise, and the durability of the medium itself, which can be played without loss of quality far more times than any analog tape. However, the CD is a storage media that must be manufactured, put into inventory, sent by carrier to physical locations, etc., and has an inherent tendency to standardization (the CD is actually a specification determined by manufacturers of both the hardware and software).

Hard costs for marketing and promotion may be better spent across a larger geographical segment, easily accomplished by such electronic networks as the INTERNET but harder to assess in terms of actual sales. Determining market reception is also difficult when buyers are relatively unknown and not available for localized comment or analysis in typical, physical retail store sites (such as Tower Records, Sam Goody's, Blockbuster, etc.).

What equalizes physical mediums such as DAT, CD and DVD, are the lines running between geographic locations, including POTs (i.e., Plain Old Telephone), cable, fiber optic, electric power lines and wireless access points including radio, satellite, cellular phones, and the like. The digitization of these access points and the networks that make them possible ultimately dictate what devices will be appropriate to consumers of the present day and the future. That is, matters of cost and even reputation will increasingly dictate the economics of the distribution of digital content, much the way much the way matters of costs and reputation dictate sales in other consumer goods markets. No longer will it necessarily be important to manufacture X number of copies of a given work for distribution at N number of sites to capture the optimal market of consumers. The present invention is predicated on not only the existence of a plurality of access points, as discussed in the DICE patent (U.S. Pat. No. 5,428,606), but also on a domain where digital content can pass freely between networks much as the INTERNET works with a common protocol (TCP/IP) to facilitate the exchange of data files. However, the ability and desire to orient delivery of digitized content around the specs that describe the content, rather than protocols necessary to redefine the content for exchange over a specific protocol (such as TCP/IP), can better define more convenient delivery of the content between publishers and subscribers given the heterogeneous nature of transmission media (POTs, cable, etc.), the unchanging behavior of "consumer electronically-described" media content (FM-quality, CD-quality, etc.), and the varying configurations of pipes utilized by both publishers and subscribers more concerned with the distribution and exchange of digital goods, not configurations of the immediate input and output devices that are linked by a multitude of electronic exchanges (cable, POTs, wireless, electric power, etc.). Indeed, shifting only the recordable media cost to consumers that, for the most part, already own one or more such devices and may have exposure to a number of broadcast and advertising media (INTERNET, on-line services, radio, cable, print, etc.) may afford both buyers and sellers the cheapest means of profitably exchanging digital goods.

At present, over 15% of the U.S. population has more than one phone line, 60 million households have cable television, and 15 million consumers are on-line subscribers. ISDN is also experiencing growing demand in the US to give consumers higher bandwidth in the interim. Projected increases of bandwidth portend future supply and demand of larger data files of copyrighted passive works (e.g., music, pictures, video, etc.) and interactive works (e.g., games, software, etc.), putting pressure on the need for increases of bandwidth. Never before has increased available bandwidth suffered from a lack of demand by users. In other words, new bandwidth seems to create its own demand. Much of the presumption in increased investments in creating the bandwidth has been to enable the transfer of audio, video, and multimedia files that typically occupy more than 5 MB of space per file. The misanalyzed aspect of these investment plans is a method for addressing digital piracy of copyrighted works and efficient, market-based allocation of the subsequent bandwidth by users. The present invention better defines maximized operations dependent more on the specs that describe playback of content than redefining additional protocols which add additional and unnecessary levels to the playback of the content. With such advances, exchanging media content can potentially be made as easy as exchanging physical content.

The present invention additionally reduces costs in the distribution process, provides the monitoring of, and thus ability to protect, copyrights within the media, and allows the implementation of better payment systems suited to the distribution of digital goods. What is clear is that bandwidth may never be unlimited, but with consideration made to real world economics, efficient and realistic methods for considering "fill rate" (the actual titles "delivered" to a purchaser versus the titles "ordered"), speed (actual time it takes for a consumer to receive desired content), and cost (expense given trade-offs of immediate availability at a given price point to the consumer, e.g. immediate fulfilment equates to higher pricing, versus delayed delivery of the same content at a lower price) all represent input variables in a real world "retail experience" that may be replicated in the digital domain. The present invention takes into consideration the behavior of parties engaged in selling content that may not be initially valued at the same price by all market participants and is subject to the same promotion hype as goods in the real world. In the digital domain, sampling, trailers, and pre-release hype can be replicated to foster demand for a given title of a digital good with many of the same results that are experienced in the real world.

Evidence of supposedly more efficient schemes for retail include U.S. Pat. No. 4,528,643 to Freeny, which shifts too much of the manufacturing costs to physical retail sites, thus increasing the cost of doing business on the retail side with possible increases of convenience to the consumer. In the Freeny patent, retailers are envisioned to have localized reproduction of given digitized products (music, video, etc.) and a means to use "owner authorization codes" to verify the electronic transmission of a given work from some "master file unit" to recordable media (VCR, recordable CD, etc.). Freeny refers to mail order clubs and other direct marketing efforts as being inefficient versus the localized manufacturing structure. These predictions have since been proven false. It is because of the nebulous concept of intellectual property coupled with the extreme expense on retailers for the in-store manufacturing units that makes clear the benefit of leveraging available bandwidth to content creators, publishers, consumers and "pipe owners." The efficiency of such operations as Federal Express in delivering even small packages in under 24 hours and the ability of "fulfilment houses" to effectively carry all but the most obscure titles (music, books, videos, etc.) has made actual "manufacturing" of a given physical media object (CD, VHS tape, etc.) or what Freeny describes as a "material object" simply uneconomical and increasingly irrelevant in an age when bandwidth and digital recording devices such as PCs, Mini-discs, digital video disks (DVD), etc. make physical retail-based, or in-store, copying more of an inconvenience.

The paradox of digital copies is the ease and relatively inexpensive operation of making perfect copies from a single instance of a work, thus providing the potential of unauthorized copies or piracy. The binary data that comprises a digitized work is an approximation of an analog signal. As is well known binary ones and zeros can be manipulated to form words, audio, pictures, video, etc. Manners in which individual copies can be marked so that responsibility can be assigned to individual copies that are derivatives of the master copy is documented in the patent applications by The DICE Company referenced above (i.e., U.S. Pat. No. 5,428,606, and the "Steganograhicc Method and Device", "Method for Human-Assisted Random Key Generation and Application for Digital Watermark System", "Method for Stega-Cipher Protection of Computer Code", "Digital Information Commodities Exchange" and "Optimization Methods for the Insertion, Protection, and Detection of Digital Watermarks In Digital Data" applications), and in alternative proposals by Digimarc Corporation (a form of pseudo-randomly encoding digital signatures into images), Bolt Beranek & Newman (embedded signaling) and others. Additional proposals for cryptolopes and cryptographic containers by IBM and Electronic Publishing Resources (EPR) place control of copyrights and other "rights" in the control of IBM and EPR, not the individual content creator or publisher. What is clear is that trusted systems, where all parties are known in some way to establish responsibility for instances of copied files, are not realistically possible with the number and ease of manufacture of digitization systems such as general purpose computing devices. At present, over 100 million such devices are in existence, and it is not possible to guarantee that all of these systems will be made to adhere to the defined parameters of a trusted machine for verification and the establishment of responsibility for individual copies made of digital works. Profit motives continue to exist for individuals to make perfect copies and distribute these copies without paying the parties responsible for creating and distributing the content. Moreover, beyond considerations of digital exchanges that do establish responsibility for the goods being sought, the digital bits that comprise the commercially-valuable works suffer both from lack of use by parties seeking more secured means of distributing and marking content, and legal tanglings by parties that own the copyrights and seek any entity deemed to copy works illicitly for settlement of disputes. That is, with the great number of untrusted systems in existence, many copyright holders have resorted to legal challenges of on-line services and individuals found to be in possession of unauthorized copies of copyrighted works. The resultant digital marketplace tends to favor larger companies who can afford to seek legal settlements without delivering any substantial benefit over smaller companies that for many reasons would otherwise favor digital distribution of content to minimize overall costs. The remedy for such problems is addressed in the previously U.S. patent and patent applications by The DICE Company and other parties mentioned above (e.g., NEC, Digimarc, EPR, IBM, etc.).

The present invention, relates to methods for parceling rights to benefit buyers and sellers of digital works in ways that even the playing field of the marketplace given the resource of electronic marketplaces that can work with such networks as the INTERNET. Too often physical world solutions are offered where digital domain considerations are completely ignored.

Another issue relating to the present invention involves haphazard grafting of physical world pricing and automated payment systems onto digital systems. Issues of inventory, physical movement, and manufacture of goods are completely muted in digital exchanges, but replaced by bandwidth utilization and efficiency, one-to-one connections, and one-to-many connections, i.e., seeking and reaching customers in an anonymous marketplace. It is these issues that will better determine the price of a given digital good. Timing of the good (that is, live versus broadcast rerelease of the same digital good) and the necessity of filters or brokers which guide individuals to acceptable goods are variables that will play roles in determining the ultimate efficiency of exchanging digital goods.

Among some of the proposed systems are a proposal by Wave Systems, which necessitates the use of proprietary boxes using encryption to tie the user's "exchange device" to some party that can determine the validity of the box, a trusted system. Unfortunately, adoption of such a solution would necessitate the purchase of separate boxes for separate vendors of particular works or the routing of all digital goods through a proprietary system that then resembles closed cable, video-on-demand, and private networks. Similar approaches are used by merchants using credit card processors and the use of credit card authorization devices and paying incremental costs for the use and security delivered by the credit card processor. Further systems include log-in procedures to validate the accessing party's identification. The premium paid for such systems is arguably excessive when compared to content creator-controlled implementation of digital watermarks and an exchange by which all distribution parties are engaged in the marketplace to pay for bandwidth rights to market-test given digital goods. The only alternative available to smaller content creators and artists is to sell content at no charge, thus jeopardizing potential future returns, or purchasing outright the hardware to plug-in to existing networks, an excessive cost if such "bandwidth" could be more fairly priced in a need-based system such as that discussed in this disclosure.

As an improvement to the system discussed in U.S. Pat. No. 5,428,606, the present invention ties so-called "header" files into the actual content. U.S. Pat. No. 5,428,606 addresses the separation of content from its references ("header") to facilitate more efficient access and exchange of digital content. The "headers" described in this patent might be construed in the real world as options or futures, and is discussed below. The present invention concerns itself with creating a method for introducing a layer of price and distribution determination given the necessity of payment in delivering digital content between points in the digital domain which may not suffer from any physical limitations but are limited by bandwidth considerations.

Some attempts at the exchange of content are being tried with existing networks such as the INTERNET. The complexities extant are apparent in the requirements of the operating protocols and the dependence of TCP/IP for orienting content and subsequently playing it back through "players" that are TCP/IP compliant, if the INTERNET is solely considered. More issues regarding the INTERNET are further discussed below.

Conceptually, "agents" partially meet some of the expectations of a content-based system, except agents are also dependent on participation by sites willing to allow for pure price comparisons and later reporting to the purchasing party. At present, many sites lock out such agents as they seek to profit by value-added services which are not considered by an agent when "shopping prices." Video-on-demand systems also propose a more closed system that is reliant on a proprietary network to deliver a video (or audio for that matter) to a consumer with the least amount of time delay while satisfying the demands for the video by many other consumers seeking the same video at the same time. The difference between such a system and that disclosed in the present invention is that such video on demand networks propose "subscriber" models where all consumers are deemed to have the same right to a given, demanded, piece of content at any time. That is, all participants are "subscribers" who prepay a fee structure that cannot necessarily be justified given bandwidth and processing limitations for delivering digital goods "on demand." In such a system, infrastructure cost can run as high as 5,000 dollars per subscriber, as with Time Warner's system in Orlando, Fla.

In the present invention, time is not an absolute standard to measure satisfaction. In the same manner that retail stores cannot always have a given audio or video work "on demand," other factors may play into the competitiveness of that entity to contribute to the satisfaction of a given consumer. These issues include a depth (number of copies or copyrights of a given title) or breadth (number) of titles offered, a variety of delivery mediums to satisfy customers with varying access infrastructure (cable, telephone, fiber optic, electric power, etc.), pricing, and, finally, service as it can be applied in an anonymous marketplace. Services may include the know-how of buyers employed by a given digital broker in offering samples of new releases or unknown artists, as well as special price offers given the amount and types of digital goods being purchased. What is certain is that a "subscriber" model is subject to the same deficiencies of a cable model or proprietary on-line service that may not be able to balance financial considerations with the variety and cost of titles sought by individuals at any given time. On the seller side, maximizing profit per title cannot always be satisfied if distribution control or proprietary rights are granted to any single entity which, by the present nature of the INTERNET and future interpretations of on-line commerce, cannot be guaranteed. Indeed, the above-mentioned U.S. Pat. No. 5,428,606 discusses a situation where all subscribers can be publishers. For smaller parties, naturally lacking sufficient resources to initially and adequately market and promote titles, a more open system for negotiating distribution rights must be sought by commoditizing the good that most effects exchange of their goods in the digital domain (i.e., bandwidth).

Moreover, in an anonymous marketplace, even small aggregators of content may be able to adequately promote the digital properties of other small content creators with value-added services. These services, such as samples of content, used to entice buyers, just as trailers create demand for upcoming movies, could be delivered to a differing type of subscriber, much as music aficionados subscribe to College Music Journal (CMJ) and other resources to sample new, relatively uncommercial music. Samples of 10-30 seconds could be sent directly to consumer e-mail addresses replicating the prevalent listening bars set up by physical music retailers seeking to introduce new titles to eager listeners. Other services might be more representative of "music chat rooms" or special title web-sites, to more fully entice potential buyers with a greater amount of purchase information. Much of the premise of such services and fulfilling demand for content, however, will require a more efficient means to allocate bandwidth as according to an embodiment of the present invention. Without such bandwidth allocation, even small digital goods vendors will need to purchase substantial hardware, from T1 lines to high-powered UNIX machines, meaning high entry or fixed costs, to effectively market what may only be a single title in a year.

The present invention deals with commoditization of the digital distribution of multimedia content. It is important to note that in creating such a market, one must consider two commodities. One is the title, or data itself, of which there is a theoretical unlimited supply over time (limited only by how many copies of a given title that can be made). The second commodity is bandwidth. This is a commodity which must be treated more like traditional commodities, since its supply is physically limited over discrete periods of time. "Fatter" pipes and compression can only increase upper limits given the observed tendency for larger data files to accompany bandwidth increases in the short term. In practice, bandwidth limits act as a parameter on the capacity of a distribution channel at any given moment in time, since there is a fixed amount of bandwidth. In dealing with commercial markets, where, for example, 80% of the consumers want 20% of the products, (and for digital marketplaces, generally all at the same instant), some premium can be observed as with "first come first serve" principles in physical sales channels. The difference is that an additional copy of a digital work can be made almost instantaneously, although additional bandwidth cannot be replicated. Even in instances with theoretically infinite time to fill all orders, most buyers will have given up and "left" the exchange after waiting a short period, during which time they get no satisfaction, measured explicitly by an access or download of a specifically desired title. On-line services today are typically plagued by this shortfall, leading most users to complaints of access and speed. Market-based principles could alleviate some of this problem on both the buyer and seller side if bandwidth was treated as the commodity it is. "Quality of service" proposals partially address this issue, though costs are stacked on the seller side because such systems are almost always proprietary given the requirement of high infrastructure expenses to enable timely delivery to all subscribers to the "private" network.

The present invention combines "efficient shopping" principles with the commoditization of bandwidth and titles to create an exchange, under principles as described in the DICE patent, where in place of a security, one can buy titles where a component of the title price is actually a bandwidth option, or bandwidth right. The purchaser buys a right on the underlying title to take delivery of the title via a particular transport medium which uses a particular allocation of transmission bandwidth at a particular time. According to an additional embodiment of the present invention, distributor or content aggregator-only purchases of bandwidth are stipulated as options for digital distribution increase, in terms of available channels (such as cable, satellite, etc.). In this case, the end user never deals with the bandwidth right, although the costs of such rights may by passed on in the retail price of the title which is purchased and downloaded. In other words, the distributor must purchase rights in advance to support a projected volume level of distribution. These pre-purchased rights are then attached to individual downloads. These instruments can vary in price, much like stock options, based on time. Only, in this case, it is the amount of time required to receive the underlying security, which implicitly indicates how much bandwidth will be used by the buyer. The bandwidth actually implies time. The spectrum could range from lowest bandwidth, such as an e-mail delivery by POTs lines, which uses bandwidth when it is otherwise not in use and is at the convenience of the seller (sender), and not the buyer (receiver), to highest bandwidth that may be parallel or direct access fiber optic line which may be necessary for users acting as wholesalers between electronically-linked parties who seek content for negotiated delivery.

U.S. Pat. No. 5,428,606 uses the concept of a "DIP" ("digital information packet") header to create an advertising, distribution, and pricing device which allows for the dissemination of references to and description of particular titles available electronically. The DICE Company's related digital watermark patent and patent applications as discussed previously disclose an exchange model for digitally-watermarked content and digital watermark keys whereby keys which allow a party to scan or imprint watermarks are distributed, possibly electronically, at the discretion of the controlling party. Both these methods have in common the fact that they allow tor the distribution of some information related to an underlying work, without distributing the work itself. It is in the interest of simplicity, therefore, to allow for the combination or conjunction of these information items in addition to associating them with a bandwidth right or option for the downloading of the copyrighted work.

Essentially, some of this negotiation of bandwidth takes place between the "Baby Bells" and AT&T or other long distance providers when settling rights-of-way between points of a telephone conversation. At present, a key difference is the utility value of a phone call sets the value of the "phone time" being sold. Bandwidth rights as envisioned in an embodiment of the present invention price the commodity of bandwidth given the luxury item being sought (i.e., data or content). The present invention seeks to value the immediacy as well as convenience (of which price may play a role) in receiving a given packet of data (media content, software, etc.) from one or many locations where it maybe available to other locations. The lines may be heterogeneous between points, thus offering a more open bidding system between line owners, content creators and publishers, and end users or consumers. At present, no such "negotiation" can be handled by network operators running lines to the same home or office. Indeed, lines are usually charged at a fixed fee, not by what amount they are used. In some cases, lines are billed by a raw measure of the data transferred, but not in relation to the actual value of such data nor with respect to the value of other transfers which might occur simultaneously via the same line. This sort of billing-by-byte tends to discourage use, but it is a very coarse tool with which to manage utilization. To fill the middle market for demand of these lines for telecommunications lines in particular, long distance carriers such as AT&T, MCI and Sprint sell excess capacity to "wholesalers," while the larger companies generally have price constraints.

The potential demand for bandwidth is clearly evident with such widespread use of networks, epitomized by the INTERNET. But, as previously discussed, smaller, specialist "retailers" and "wholesalers" of services or content that could be marketed over these lines are not efficient. The potential for efficient pricing exists as demonstrated by "call-back" services, which route calls from one location through a third party location, benefitting from that location's line pricing, though the overall market for such services is still only about $300 million annually. What restricts more open allocation of bandwidth is political in nature. At the same time, cross subsidization of local phone access from more expensive long distance and international service is open for rationalization envisioned by the present invention. Even if more network services could offer greater returns for line use, and thus bandwidth use, public telephony accounts for over 85% of the market. A particular model being evaluated is called "sender takes all" where the access point, or the party that provides access to an end user, would take all the access charges. This is similar to the INTERNET, but is still stacked against smaller players, of which content providers are the least favored if they seek "distribution channels" over networks that still lack proper market incentives for use of bandwidth. Some other models being considered include a single access charge, which is an improvement over current international accounting standards being negotiated between countries. Still, this model does not take into consideration the available bandwidth controlled by non-telecommunications parties, such as cable companies, though ultimately the commodity being brokered is actually common bandwidth. The uneasy balance in negotiating access is being tempered by the steady increase by telecommunications companies to upgrade their lines to offer comparable bandwidth access as that presently available through cable companies. A final issue for consideration is the mobile market of cellular phones and other similar technologies though there are far more restrictions on the amount of available bandwidth for content distribution, the move to free up more radio spectrum for digital signals may lead to increases as high as a hundredfold in the capacity of the network which would make the electronic delivery of a single audio track realistic. Still, the present invention seeks the imposition of market-based pricing of available bandwidth to end users and content providers given the absence of any such system currently.

With the recent removal of barriers which previously prevented competition between cable companies, telecommunications companies, and regional Bell operating companies (RBOCs) the matter of cost of services or content being delivered over common pipes and the concept of a single entity dominating the "network" will almost surely come to an end as many companies are strongly positioned in their local markets. At present, "local loop" access to end users still presents formidable barriers to competition—40-45% of the cost of a long distance call is paid to the RBOC whose lines run into the home or business making the call. In total, the cost to a network for local distribution is approximately 80%. Proposals for separating a network into its infrastructure and service components would likely benefit from the invention being outlined. In such a scenario, the owner of the network would offer access to providers on the same terms, while managing the operation of the infrastructure. Simple models, such as flat rate INTERNET access, are problematic in the overall model for market-based pricing of bandwidth in that capital costs are completely ignored though such costs are the parameter by which any business model must be judged. Though the cost of an extra phone call over a given network may be negligible, the cost of pumping large multimedia files, which have far different utility value to users of the network versus a "telephone conversation," is relatively high in the aggregate and can be witnessed with the progressively slow performance of many on-line providers and the INTERNET. The goal for network providers will be to offer value-added services to users as well as value-added access to content that is controlled by copyright holders seeking maximum distribution (given speed and quality) to content seekers. These parties may only need the network at certain times or for certain releases of content. Meanwhile, periphery services such as music sampling, game testing, beta software distribution, will most likely comprise value-added services beyond the present scope of strict telephony. The pressure, generated from capital cost concerns, to provide a system that prices speed and line capacity is aptly answered with the creation of bandwidth rights and incorporation of such rights into the electronic distribution of content. In this way, specialist companies will strive through buying bandwidth of transmission capacity and adding value by attracting customers seeking said companies' accessible content.

Bandwidth rights are necessary as an improvement over the art. The INTERNET currently dominates any discussion of digital distribution. The INTERNET is built over lines or pipes. It is an important observation that a) these pipes cost money to build, deploy and maintain, and b) the owners of the pipes must pay for their investment and earn some return, which is their motivation for building the infrastructure. The means by which files are transferred over the World Wide Web, the most mainstream segment of the INTERNET, is the use and interpretation of Hypertext Mark-up Language (HTML) and embedded URLs (Uniform Resource Locators) which is designed to "alias" and designate a single path between the party that is viewing a reference of a file and the underlying file. The user is unnecessarily "connected" to the actual file, which is called "aliasing," and has effectively created more network traffic and thus wasted bandwidth. This shortfall in HTML is affecting the INTERNET through inefficiencies resultant from the underlying connection-based TCP/IP protocol. In short, a lot of needless, bandwidth-wasting connections are continuously being created and destroyed. The current mechanics of the INTERNET will not be conducive to electronic commerce, and must necessarily change. This fundamental aspect of splitting content from references to that content is amply addressed in U.S. Pat. No. 5,428,606.

The biggest problem can be summed up by observing that users of the INTERNET generally live under the misconception that data or content is, or should be, free. Although one can find specific instances of goods and services sold over the INTERNET, even downloadable software, the basic mechanism that underlies the sale is subject to this "fallacy of the free." There are actually many hidden costs, some of which were discussed above. As for the content creator or publisher of said works, monitoring of sites and legal enforcement of copyrights is still significantly difficult without better education of consumers and site administrators, as well as a means for detecting unauthorized copies on an archive as disclosed in the digital watermark filings. Recent legal actions against parties that distribute copyrighted music titles and game software has resulted in setting a "for price" trend that can be made more efficient by the present invention.

The present invention deals with creating a coherent pricing model for on-line distribution, which accounts for bandwidth utilization, maximizes pricing options and efficiency for sellers and buyers, and, additionally, as a result of the process of trading and pricing of the bandwidth options, ensures that usage of the limited bandwidth is orderly. All orders result from requests filled and thus are generally a function of the price of the so-called option on bandwidth. The present invention also presents improvements over exchanges that exist for the purpose of trading commodities such as stocks, bonds and other such securities. The distinctive feature of the preferred embodiment described below is the nature of the commodities being traded, bandwidth, and the unbounded potential of derivative copies of copyrighted works.

In current trading mechanisms NASDAQ (National Association of Securities Dealers Automated Quote system) is a well-known model. Looking at details of the NASDAQ market will illuminate exchange operations and the present invention's improvements over the present art for both market exchange mechanisms and implementations of a content-based system that monitors copyrights and optimizes the distribution of the underlying content.

The NASDAQ Market

NASDAQ is an exchange that trades in a finite number of "titles" or stock certificates, whereas the present invention is concerned with the potential of an infinite number of "titles" made up of digital bits—each derivative copy having the same potential commercial value as the original master copy that was intended for trade. The limited or finite commodity in question on a DICE exchange is available bandwidth for the actual transmission and thus delivery of a demanded, digitized "piece" of content (audio clip, picture, video, virtual reality, software, etc.). Bandwidth is characterized by the pipes that connect buyers and sellers of digital information and include POTs, cable, fiber optic, ISDN, satellite, electric power lines, etc. On the other hand, NASDAQ deals with basic stock securities, publicly-traded shares in companies. There are a small number of derivative securities traded, notably warrants, but the mechanisms for supporting a particular security are fairly uniform. NASDAQ is primarily an electronic bulletin board where market makers advertise at what prices they are willing to buy and sell a particular security. These market makers maintain an inventory of tradeable securities for sale to other parties, whether agency or principal-based transactions. A market maker does not necessarily equal a broker, although a market maker can also be a broker. Both market makers and brokers can participate in the system, but market makers are the heart of it. A market maker is a paying member of the NASD (National Association of Securities Dealers). In effect, they own a stake in the market governing body, and agree to be obligated to buy or sell a certain minimal amount of shares, in order to provide liquidity in the market "Confidence" in the market mechanism, that is NASDAQ itself, is in the best interests of the participants or the ultimate buyers of securities will not be willing to bid on securities at uncompetitive prices. Similarly, an artist wishing to sell their commercially-valuable copyrighted content, must be relatively confident that each derivative, perfect digital copy, has some mechanism for identifying the initial purchaser and give all subsequent market participants a way of ensuring the copy of the content they possess is not an illicit or unauthorized copy. Previously discussed disclosures on digital watermarks cover these issues as a means to bring more artists and publishers into the digital marketplace to increase activity and liquidity.

Like the "specialists" on the NYSE (New York Stock Exchange), NASDAQ market makers earn a profit on the spread between the BUY and SELL price of a stock, assuming they can buy low and sell high (or short high and buy low). Market makers risk their own capital, trading a group of stocks, and can generally make profits trading shares for incremental profits. Such an instance would be selling at 10 and buying at 9⅞. Many market makers trade the same stocks competitively, and in general, the more firms that make a market in a given stock, the more liquid the trading of that stock is, simply because there are more ready buyers and sellers. Again as a means to describe the present invention some understanding of these market participants may be required in implementing the proposed system.

Although NASDAQ can be thought of as an "electronic" market, it is electronic, for the most part, only in the sense that instead of shouting across a floor at each other, traders generally advertise their price levels on a BBS (Bulletin Board System), which legally binds them to honor the price. They then field phone calls from traders at other member firms, who have seen the advertisements on the BBS, and agree to trades over the phone. Then, each side enters their transaction (if one side is a BUY, the other is a SELL) into on-site computers, which all feed into central mainframes and link up with each other. Many errors are introduced by this process, and an error report is produced at the end of the day, to be settled among the parties involved through after-hours reporting. So, there is really still a large low-tech component to NASDAQ which leads to discrepancies and inefficiencies.

The general public interacts with the market through brokers, who might also happen to work for a member firm. The chain of contact is individual to broker to trader, with traders interacting among each other, and filling orders for brokers. This also touches the issues of primary and secondary markets. When a stock goes public, called an IPO (Initial Public Offering), shares are bought up by a syndicate of market makers. This is the primary market. The proceeds of the IPO go to the issuing company, minus the underwriting fees, which are divided among the syndicate. The syndicate then sells shares to the public through brokers, and any other traders who want to trade them. The syndicate may profit again by selling the shares at higher prices than the original purchase price. This trading continues indefinitely or until bankruptcy. This is the secondary market. Prices in the secondary market can vary continuously and widely from the price set in the primary market.

Having summarized the system, we can discuss some of the inefficiencies and idiosyncrasies of NASDAQ to establish the parameters of the present invention in the preferred embodiment One major problem is the uniform distribution of information. Theoretically, all traders should get the same information at the same time. However, NASDAQ does not accomplish this well. Since there are intermediate "concentrators" between the terminals and the hub, and specific terminals tend to watch specific groups of stocks, some of which may be significantly more active than others, generating a larger volume of information per second, which can cause backups, in general, the system is plagued by delays of an intermittent and non-uniformly distributed nature. There is no mechanism for detecting these problems, which may cause the display of old or incorrect prices for some stocks, and delay the dissemination of electronic orders on an unequal basis. Traders generally have several sources of information, and need to be "on their feet", so the burden of detection is, in effect, placed on humans. NASDAQ terminals do maintain a "heartbeat." If the terminal cannot get a response from the hub for a prescribed period of time, a problem is signaled by turning the screen a uniform yellow on black. However, most significant information delays do not trip this mechanism. Market makers have cooperated to run independent tests, and are well aware that one trader may see information up to several minutes before another. There is no aging of information. The present invention partially concerns itself with information aging as content can be time-sensitive, and up-to-date bandwidth rights pricing is important. Such instances include news reports, live broadcasts, initial "be first" demand for a particular piece of media content, and the like.

A NASDAQ hub may send out information to all routes simultaneously, but there can be large delays before it arrives at the destination. An example of a timing performance protocol, which can be employed to counter such problems, is NTP (Network Time Protocol) on UNIX networks. NTP does advanced diagnosis of point-to-point network performance to forecast timing delays between pairs of machines. It is used with time critical applications, but not widely so, as it is still considered quite esoteric. NASDAQ makes no use of such protocols. For more trustworthy information about bandwidth rights and the aging of a media content good, the present invention takes into account forecasted timing delays for pricing the subsequent bandwidth right as an overall component of the pricing of the media content being demanded, and delays in actually distributing this information. This is an improvement over the art as it is a more appropriate aspect of pricing media versus disseminating stock price information.

Before considering the present invention's clearing operations, which are vital to simplifying the otherwise tremendous task of figuring out who owes what to whom at the end of the day, a description of the art, a la NASDAQ, is required. Basically, clearing is the matching up of trades. If one side reports a SELL, and the other a BUY, these two sides must be put together to form a trade which results in the transfer of money to the seller, and the transfer of the security to a buyer. Any halves of trades that do not match are kicked back to the member firm who entered them, for resolution. Provided the trade is resolved, both sides again enter their sides, only late. The securities can be held in street name, meaning the brokerage house can hold the physical shares for the buyer. However, the task of transferring stock certificates and cash among brokerage houses is onerous. Instead, a special holding organization was created. This organization is independent of the stock exchanges, but works with their clearing computers. The holding organization maintains vaults filled with stock certificates, held for the brokerages, which in turn hold the stock in the names of their clients. Everyone maintains records of who owns what relative to their own organization. Should an owner actually request their certificates, they can be removed from the vault and delivered by way of the brokerage firm. At the end of a day's trading, the hub computers at each exchange (whether NASDAQ or NYSE) net out the differences among the member firms, in cash and stock, over many trades, and produce a report of who owes what to who, in net terms, relative to each stock. The firms have a certain number of days to settle the trades (which allows for correction of errors, and transfer of funds). This allows a single day to result in one transaction for each trading firm for each stock it trades. This sort of clearing is key to the efficiency of any trading system. With the exception of a certificate delivery request, no security certificates need be moved, and cash can be transferred by wire.

Defining the Value of Bandwidth Rights

It is an object of this invention to create a trading instrument which will break bandwidth resources into discrete, usable component pieces, and allow an electronic market system to set a price for this scarce commodity which sets an equilibrium level of supply and demand. The net effect of this instrument, and its trading system, will be to efficiently apportion bandwidth to users who wish to download or upload valuable information, in whatever form it takes. Bandwidth affects the speed of information transfer. If more bandwidth is used, speed increases, and the transfer is accomplished in less time. If an individual instance of this instrument is a bandwidth right, it can be observed that several factors will affect its value:

Intrinsic Value

This value is measured versus a minimal standard telecommunications cost. If there is a single underlying telecommunications cost to the owner of the right of X dollars per minute, let $min_0$ represent the number of minutes it takes to download the information using the minimal bandwidth, and $min_1$ represent the number of minutes to transfer the information at the bandwidth represented by this right. Note that $min0 >= min1$.

Then the intrinsic value $VI = X \times (min0 - min1)$, or the amount of money saved in telecom costs at the higher bandwidth. The intrinsic value can be negative, which would imply a compensating premium placed on the time saved by using the more expensive transport.

Percentage Chance of Failure

This probability recognizes the generally unreliable nature of the current telecommunications and transmission mediums as well as underlying computer systems. Rather than be burdened with the task of solving all of the "bugs" in a given piece of commercial software, it would be better to account for failure in the valuation. This value could be adjusted over time, as the failure probability of a system becomes more apparent, or changes. In short, this represents the percentage chance a user cannot exercise their right. It affects the expected value of the right. In this baseline approach, if the probability of failure is $P_f$, where $0 <= P_f <= 1$, and the value of the right is $V_0$, in the absence of failure, then $V_f = (1 - P_f) V_0$.

Convenience Premium

This represents some premium, $V_C$ that a person is willing to pay to transfer their information within a specified period of time (i.e. "now" or "in the next 10 minutes"). This premium is likely to come out as the market sets the price for a right. If there is a formula for what the price should be, then the premium is simply the difference between the result of that formula, and the actual market price. This really measures the balance between supply and demand. The more demand in excess of supply, the higher C will rise. $V_C$ is then a function of supply and demand.

$$V\text{real} = V\text{theoretical} + VC$$

Time Value

This is a function of the exercise period of the bandwidth right. It is proportional to $P_f$, since more time allows for recovery from an individual failure to transfer. There are two components of time, over what period a transfer can be initiated and for how long the transfer can last once it is initiated. Note that this is made more complex by congestion factors. For instance, if a user has a right for 10,000 kbps for 10 seconds, and the user wants to transfer 100,000 kb, it is not likely that the transfer can be done in exactly 10 seconds. Protocol overhead and congestion will add some increment of time. It is advisable to leave room in the exercise period for these factors, rather than trying to value the time value in some manner which accounts for these transient conditions.

Thus:

$$V = (1 - P_f)(V_I + V_T + V_C)$$

or $V = (1 - P_f)((X(\min_0 - \min_1) + V_T) + V_C$

The convenience premium, $V_C$, should be independent of all other values (except V).

The equation behaves as such:

With increased failure probability decreasing rights value, independent of other variables, while increased demand relative to supply would drive up $V_C$. We might try to compute $V_C$ by accounting for known demand and supply values, and in fact, it is of vital importance to know the supply, and to allocate it so that any right issued can be exercised within its exercise period.

Additionally, it is observed that a method is needed to allocate supply based on demand which accounts for unused rights. In other words, the system needs to over allocate supply to some degree, knowing that some rights may go unexercised, so that demand is filled as much as possible. This is similar to airlines' practice of overbooking flights.

Some mechanism must be in place to prevent attacks on the system, by a party, who, in effect, tries to corner the market in bandwidth, with no intention of using it, so that it goes unused. Naively, one would think that since one has to pay for the bandwidth, why would someone want to corner the market? Although bandwidth is not free, it should only comprise a small fraction of the value of the information to be transferred, and so this is not an unthinkable situation. The likeliest preventive measure is the existence of competition in transmission.

Another option is the potential need to necessitate a secondary market for the trading of bandwidth, which could be divided up by a trading syndicate, and traded on a secondary basis to users. In a manner of operations, telecommunications companies perform this role between national telecommunications systems to facilitate international phone usage. But the difference with the system envisioned in the present system is that "any" user could buy bandwidth rights at times of low demand, and hope to sell them at a profit in times of higher demand. This would seem to imply the exchange itself should do some proprietary trading in this manner, both to profit, and to ensure some bandwidth is available for sale to users when they need it. This will have a purpose to serve in making the market efficient in the future.

Bandwidth rights instruments are likely to be highly localized to specific subnets. Especially since certain types of connections may be available only from certain exchanges, and since failure probabilities are likely to vary with specific hardware, operating systems, and service providers. Additionally, the basic valuation equations above do not address telecommunications costs across various types of lines. This problem at least, might be solved by active maintenance of cost tables, designation codes for types of lines, and the designation of a low cost standard. The problem of moving rights between exchanges is made more difficult since supply/demand planning for one exchange will not translate to another, unless some means for interconnecting exchanges is developed, and exchange bandwidth planning is global. The race by many parties to link users to the INTERNET via varying access links (modem) including ISDN, POTs, cable, may further the need for common bandwidth pricing. What is clear is that the basic structure of the present invention would facilitate such planning to the benefit of all market participants: telecoms providers, INTERNET access companies, users and publishers as well as more general aggregators of content and bandwidth such as, phone companies, cable companies and satellite companies intending on providing services across multifarious line types.

Bandwidth Rights Accounting and Clearing

If a bandwidth right is securitized, the creation and supply of certificates, made unique by cryptographic methods to manage them, will also be necessary. Transferring certificates between individuals is complicated and unnecessary. Following the general principles of the securities clearing model described above seems to be in order. In this case, the exchange needs to create and manage an account for each party that can own or trade bandwidth rights. Additionally, a method for authenticating the party is required. With these two elements, a trading market can be implemented by the following methods:

The exchange creates and manages a supply of uniquely distinguished bandwidth rights certificates. These certificates are good for a specific period only. They may traded over the course of time, anywhere from the moment they are created to the expiration time. It is questionable whether a right should be exercisable once it is clear that even if a transfer is initiated, it cannot be completed given that right only. However, consider that the right is usable, but its value decreases rapidly as it approaches expiration (i.e. value is based on time left, not total transfer time). Once a certificate is expired it is deleted. Hash values incorporating a timestamp could be used to serialize certificates. Such a cryptographic method is well noted in the art. U.S. Pat. Nos. 5,136,646 and 5,136,647 ("Digital Document Time-Stamping With Catenate Certificate" and "Method For Secure Time-Stamping Of Digital Documents" respectively) describe methods for cryptographic time-stamping.

The exchange creates a central hub for planning bandwidth supply, accounting, and disseminating pricing information. Client-side software will value the rights relative to a particular user's needs, and used by any party trading rights. A seller creates a SELL advertisement, which is entered into the "exchange". The exchange verifies the seller actually holds the right in their account. A buyer then enters a BUY offer against the sell advertisement. The exchange validates the buyers, and then clears the transaction, transferring money from the buyer's payment method (credit card, etc.) to the seller's account, and the right to the buyer's account. The unbundled right may be so infinitesimal that the actual cost of the right must be bundled with the underlying content or information being sought. The rights could also be bound to underlying titles. This may be similar to attaching sales taxes, handling charges, and credit card use charges that are typically bundled with the cost of a given physical goods purchase.

Multichannel Watermarking Mechanisms and Techniques

One problem with the digital watermark systems is the need for a mechanism by which multiple parties may add watermarks to a given piece of content at different stages of distribution, without any one party needing to comprise the security of its watermarks to any other party. Although an "exchange" system allows for two-way communication, a particular "distribution path," may be taken to be the path by which a package of data travels from a source party to a destination party. So, a distribution may be a single side of an "exchange". In this context, it is useful to speak of parties to the distribution as "upstream" or "downstream" in relation to each other. The initial source would be farthest upstream, while the ultimate destination party would be farthest downstream, with any number of parties along points in the middle. If the data in a distribution flows from party A, through party B, to party C, then:

party A is upstream from parties B and C;
party B is downstream from party A, but upstream from party C;
and party C is downstream from parties A and B.

The above example should make clear the relationships between upstream and downstream parties.

It is a useful goal, and an accomplishment of embodiments of the present invention, to provide a mechanism and technique for the purpose of allowing any party to the distribution to add at least one channel of watermark information, which exists separately and is secured by means of a separate key, to the data of the distribution in such a manner as to ensure that one or more watermarks of the other parties to the distribution remain present in the data when it reaches its final destination.

A significant improvement over traditional metering systems is that exchange mechanisms are beneficially tied into content for more realistic metering of playing or recording content. With multichannel digital watermarks, a more robust means for metering content is made possible by parties not willing to create expensive proprietary distribution channels, but who do wish to capitalize on selling content in the economic method of metering. There are two immediately apparent schemes which might accomplish this. This first is described as a "passive" scheme and the second is described as an "active" scheme.

In a passive scheme, several assumptions must be decided and jointly agreed upon beforehand by all parties who wish to add watermarks. Based upon the total number of watermark channels to be used, where each party that wants to add a watermark is assumed to use at least one watermark channel, and the amount of data, and the desired minimal level of watermark security, a watermark system could encode watermarks at an appropriate sparsity such that random chance will cause some watermarks added by downstream parties to obliterate watermarks added by upstream parties. But by the same token, random chance will allow some of the watermarks of upstream parties to survive the encoding of watermarks by downstream parties by virtue of the fact that such watermarks do not occupy enough of the same data space to cause one to significantly interfere with the reading of another. The end result is that at least one watermark added by each party will be readable at the final destination. While such a passive scheme is appealing because of its relative simplicity, in which each party can add watermarks without considering the impact of any other party, once some initial parameters are set, this type of scheme requires a lot of testing to determine optimal settings given various initial conditions, and does not guarantee any particular level of watermark redundancy. It is quite haphazard, although technically feasible.

According to an advantageous embodiment of the present invention, an active scheme is implemented which is described as follows. The farthest party upstream, who presumably controls the ultimate copyrights and distribution rights of the data generates two keys. The first key is a regular watermark key, as described in previous related patent application disclosures by The DICE Company, particularly, including the "Method for Stega-Cipher Protection of Computer Code" application. This key is used for actual encoding and decoding of information from the watermark channel "owned" by this party. The second key is a new type of watermark key, called a master framework key, which dictates how the entire data stream in general is to be packetized;
how the data stream packets are to be allocated among a predetermined number of reserved watermark channels; and
how the channels are to be assigned to downstream parties.

This information is the minimal amount of information which must be shared with downstream parties to enable them to add watermarks using their own regular watermark keys to their assigned channels. Notice that within a given channel, another key is still needed to extract a watermark. Therefore, while some information is potentially leaked, the watermarks are still secure. The master framework key, in effect, creates several virtual data streams within the real data stream, each of which can be accessed separately by the watermark system. The master framework key can then be shared on a limited or protected basis with only those downstream parties who the upstream party chooses to participate in the distribution. Such master keys could be distributed using well-known cryptographic art for key transmission. Each downstream party is responsible for generating their own regular watermark key, and watermarking their assigned channel with appropriately generated information using the combination of the master framework key and the regular watermark key, as the data is received and forwarded. This active scheme is much better than the passive scheme, since it ensures that watermarks added by downstream parties do not interfere in any way with those added by upstream parties, thus guaranteeing a maximal level of watermark redundancy, which is desirable, while minimizing the disclosure of watermark information necessary to downstream parties, which is undesirable. It is envisioned that systems that use a hybrid approach, incorporating some mechanisms and methods of the active scheme, but also relying on some methods of the passive scheme may be developed.

Keysearch Optimization Mechanisms and Techniques

Another issue of digital watermark system which must be adequately addressed is key search. When a suspect copy of content is obtained, the amount of work done to extract watermark information from the copy is bounded by the set of watermark keys which are potential candidates which may have been used to encode the hypothetical watermark(s) in the suspect data. It is an object of the invention described herein to minimize the amount of work and hence time required to search this set of keys, or keyspace, while ensuring confidence that all potential candidate keys have been searched, or at least those candidates with a significant probability of constituting the actual target of the search.

The watermark decode operation proceeds generally as follows: First a candidate key search group is generated, then a decode process is run using each candidate key until either all keys are exhausted and no watermark is extracted, or a watermark is extracted using a candidate key. Depending on the nature of the information in the extracted watermark, the search might continue with remaining keys, or terminate. One obvious method for improvement is to perform parallel searches trying multiple keys at the same time. Using powerful parallel hardware, real gains may be obtained using this method simply.

On slower, serial CPU-based hardware, real parallel gains are more difficult to make. However, using dynamic programming techniques and intelligent search scoring and management, one could configure the search engine to start with several or all keys, checking each packet of data against each key before proceeding. As each iteration is completed, factoring in the next data packet, cumulative "scores" for the results of each key may be computed and compared. Keys which appear to have more potential to ultimately yield a match and extract a watermark continue to be used in the process, while those with lower potential, as measured by score, are dropped from the process. This process has an attractive characteristic that it gets faster as more keys are progressively eliminated from the search space, and can consider a large number of keys. Its drawback, in the absence of other techniques, is that the initial key space may be very large, and it may take considerable time to narrow the search keys to the point where the search proceeds at a reasonably fast pace. It is also possible that the process of finding a match does not score in a monotonically increasing manner, resulting in the early elimination of the correct key. In other words, scores may get worse before they get better.

Without considering any information about the source copy used to generate the suspect copy, one could limit the search work done by imposing a limit on how much time a decoder can spend checking data versus a particular key, or a maximal percentage, or number of packets of the copy to process before giving up on a given key. One could do well with a heuristic rule that says, "if I have checked 50% of the recording without finding a watermark, then in all likelihood I will not find a watermark in the other 50% of the recording with this particular key", for instance. However, the best gains can be made by eliminating as many keys as possible from the initial search pool. In order to do this the keys are expanded to included several items of information regarding the source copy or master that was watermarked using the key in question. This information includes any of the following items:

Title, Artist, Date, size of recording, format of the recording, quality of the recording and may also include mathematically calculated properties of the recording which can identify the recording to some significant degree of probability while using only a small amount of data (i.e. localized hash values, etc.). When a suspect copy is obtained, this same set of information describing the suspect copy is generated by the decoder system, which can then select a set of candidate keys which match to a desired degree, any or all the criteria stored with the keys.

Finally, the best potential results may be obtained by taking advantage of the multiple access levels made possible by the watermark system described in previous filings. A watermark embedded in a higher privacy channel corresponds with a particular key. Every key has a unique identification which allows the key custodian to find the key in a database, but provides no information on the key itself. This identification may have no meaning outside the custodial system. If the higher privacy key identification is included in a lower privacy watermark such as a protected or public watermark, then the party searching for the higher privacy watermark makes use an intentionally limited set of lower privacy keys to first extract the key identification of the higher privacy key. At this point, no additional key search is necessary, a significant time savings. This assumes the lower privacy watermark has not somehow been removed from the digital sample stream.

An embodiment of the decoder key search system would encode private key identifiers in lower privacy watermarks and uses descriptive information in the keys to compare versus the suspect copy to narrow the key search space. This embodiment makes use of parallel hardware to facilitate as much gain as possible from parallel search techniques described above, including progressive elimination of keys which appear to diverge from a match as the comparison progresses.

In an exchange mechanism according to an embodiment of the present invention, the exchange is not the source of any of the sought-after works or digital information packages (DIPs). The exchange is ultimately measured by available transmission resources. Whereas DIPs are measured in a digitization system, the size of the underlying data file, its file structure, which dictates any potential compression and buffering, and data overhead for error correction, will provide exchange participants with an estimate for the resources, including time required to distribute said DIP. Given the heterogeneous nature of existing and proposed line infrastructure, any DIP can potentially be exchanged over vastly different lines between points. These may include copper, coaxial, fiber optic, etc. Distribution of a given DIP may occur on different lines for the same work (say for instances of a work available over POTs and satellite, etc.) or over a number of different media in the distribution of a work as it is transmitted over a network with a plurality of transmission media (say, the backbone of the network may be fiber but the end loop is coax, etc.). Given the existence of other traffic over these lines, including telephony, the pricing of a given DIP should necessarily include the price of the bandwidth resources necessary to transfer the DIP between at least two parties. As previously discussed, the difference in this embodiment and systems such as video-on-demand or proprietary cable and satellite systems is the necessity to value bandwidth between points in a network to facilitate the exchange of a demanded work at a given instant in time not continuously as with traditional "subscriber models." Similarly, "time-share" systems are oriented around selling a parcel of time to users seeking "processor" access to perform some activity, while, bandwidth is not the commodity being bid, time shares are reservation systems not capable of bidirectional or end-to-end "negotiation" of resources to facilitate the exchange of a DIP in real or next-to-real time. Further, the preferred embodiment differs in that all participants may have significantly different access infrastructure (differing modems, cable, electric powerline, satellite, etc.) and pricing preferences given demand for a particular DIP.

The price of the bandwidth resources is, thus, proportional to the percentage of bandwidth allocated to the transfer of the DIP and inversely proportional to the duration of the transfer. With these factors, the aggregate of available bandwidth must change with time and can appropriately be priced given the demand of certain DIPs or publishers seeking to effectively distribute DIPs. Bandwidth allocation can then be securitized to reflect the varying needs of market participants to exchange DIPs. How this security is priced relates to the nature of the underlying DIP which is most likely a luxury item such as a musical recording or video game. The securities must then trade independently of the DIPs and are based in part on a convenience premium, given demand for bandwidth allocation at any given time. Additionally, network resources as measured by present digital packet switches provide the variable of "supply of bandwidth resources" and estimated demand for said resources at a given time. For networks that are more centralized, such as cable or satellite, estimating bandwidth resources may actually be far easier as traffic is generally downstream to customers not bidirectional like telephone networks. Further means for computing bandwidth securitization instruments take into consideration probability of failure to exercise an instrument, the time period for which said instrument is valid, intrinsic value relative to minimum standard bandwidth utilization for the line in question. These factors, when coupled with a convenience premium, are improvements over the prior art as described in the U.S. Pat. No. 5,428,606. Bidirectional exchange of content by parties who can be both subscribers or publishers or both, are possible when the party wishing to sell content or DIPs can set distribution, pricing, and other informational fields at its discretion. These issues are well documented in U.S. Pat. No. 5,428,606 and are increasingly important in the growing popularity of the World Wide Web (WWW) portion of the INTERNET. But, given that the marketplace in which digital goods can be traded digitally is itself digital, the evident or potential scarcity of bandwidth or the ability to value existing bandwidth given a commercial market for digital goods exchange is invaluable.

Further, security of the content and records of said content can be further described as an improvement over methods to undeniably identify content through the use of digital watermarks and other similar technologies. It is desirable to take appropriate measures to protect as many parties as possible in the transaction of a copyrighted work. These parties may include the copyright holder, publisher, distributor, retailer, and consumer. As with the physical monitoring of media products such as CDs, where physical checks are conducted by the label, manufacturer, distributor, retailer and even outside parties such as SoundScan, Billboard, etc. the digital domain contains far less means for "hands-on" metering without including watermarks as "secured identification" for parties involved in the distribution chain. As a preferred embodiment of the present invention, a record of a given DIP should include at least two of any of the following three elements: a digital watermark key, a DIP header, and a bandwidth securitization instrument (bandwidth right). The DIP header describes the content, its address, pricing, and distribution. The bandwidth right is unique in its instance but also varies according to network bandwidth availability for a given period of time and the duration of the actual use of bandwidth on said network.

Optimizing key searches and increased use of multichannel digital watermarks are delineated in the discussions that follow this preferred embodiment as they are additional improvements over the art. The embodiment thus far discussed makes possible a more "democratically" or "economically" feasible market for the exchange of digital goods. With bandwidth rights, multichannel watermarking, optimized key searches, content-base metering, it will be possible to more fully replicate retail and wholesale environments as they exist in the physical world. Decisions about depth and breadth of services and goods that can be offered by on-line market participants will differ only in the ability to offer access to archives (POTs, cable, satellite, wireless, etc.) which will be determined by pricing and speed of transmission as well as by content providers interested in tapping into the potential distribution market that the pipe owner's network includes. Market participants will also be able to appeal to the anonymous parties that seek content through attractiveness of a "site," amount of processing speed available for distributing digital goods, staff responsible for purchasing or creating available content for downloads, the number of available repurchase rights of copyrighted works: "electronic window-shopping" can be realized given heterogeneous networks, many digital goods, and the creation of bandwidth rights to complement digital watermarking systems. Simply, content can better be valued given the infrastructure of the digital domain while recognizing/he importance of tracking and monitoring the exchange of digital goods.

While the discussion above has described the invention and its use within specific embodiments, it should be clear to those skilled in the art that numerous modifications may be made to the above without departing from the spirit of the invention, and that the scope of the above invention is to be limited only by the claims appended hereto.

What is claimed is:

1. A method for applying a digital watermark to a content signal, comprising the steps of:
    a) generating a watermarking key comprising a binary sequence and information describing application of the binary sequence to the content signal;
    b) encoding the digital watermark within the content signal at one or more locations determined by the watermarking key; and
    c) generating a key pair associated with the watermarking key.

2. The method of claim 1, wherein the key pair includes an encode key and a decode key.

3. The method of claim 2, further comprising: using the decode key to authenticate the encoded digital watermark.

4. The method of claim 2, further comprising: using the decode key to decode the encoded digital watermark.

5. The method of claim 1, further comprising: adding a digital signature to the content signal; and using a decode key to authenticate the digital signature.

6. The method of claim 1, further comprising:
    said key pair including an encode key and a decode key, said decode key being incapable of decoding the encoded digital watermark.

7. A method for decoding a digital watermark encoded in a content signal, comprising the steps of:
    a) identifying a key comprising a binary sequence and information describing where in the content signal the digital watermark is encoded; and
    b) decoding the digital watermark at one or more locations determined by the key.

8. The method according to claim 7, wherein said key authenticates the digital watermark.

9. The method according to claim 7, wherein said key authenticates at least one of a plurality of digital watermarks encoded in the content signal.

10. The method according to claim 7, further comprising; using the digital watermark to meter the content signal.

11. The method according to claim 7, further comprising; decoding the digital watermark upon reception of the content signal.

12. The method according to claim 7, wherein said key is random or pseudo random.

13. The method according to claim 7, wherein either said digital watermark or said key affect access privileges to said content signal.

14. A device for applying a digital watermark to a content signal, the device comprising:
- a processor for generating a) a watermarking key comprising a binary sequence and information describing application of the binary sequence to the content signal and b) a key pair associated with the watermarking key; and
- an encoder for encoding the digital watermark within the content signal at one or more locations determined by the watermarking key.

15. The device of claim 14, wherein the key pair includes an encode key and a decode key.

16. The device of claim 15, further comprising: using the decode key to authenticate the encoded digital watermark.

17. The device of claim 15, further comprising: using the decode key to decode the encoded digital watermark.

18. The device of claim 14, further comprising: adding a digital signature to the content signal; and using a decode key to authenticate the digital signature.

19. The device of claim 14, further comprising:
- said key pair including an encode key and a decode key, said decode key being incapable of decoding the encoded digital watermark.

20. A device for decoding a digital watermark encoded in a content signal, the device comprising:
- a processor for identifying a key comprising a binary sequence and information describing where in the content signal the digital watermark is encoded; and
- a decoder for decoding the digital watermark at one or more locations determined by the key.

21. The device according to claim 20, wherein said key authenticates the digital watermark.

22. The device according to claim 20, wherein said key authenticates at least one of a plurality of digital watermarks encoded in the content signal.

23. The device according to claim 20, further comprising; using the digital watermark to meter the content signal.

24. The device according to claim 20, further comprising; decoding the digital watermark upon reception of the content signal.

25. The device according to claim 20, wherein said key is random or pseudo random.

26. The method according to claim 20, wherein either said digital watermark or said key affect access privileges to said content signal.

* * * * *

UNITED STATES PATENT AND TRADEMARK OFFICE
CERTIFICATE OF CORRECTION

| | |
|---|---|
| PATENT NO. | : 7,343,492 B2 |
| APPLICATION NO. | : 11/244213 |
| DATED | : March 11, 2008 |
| INVENTOR(S) | : Moskowitz et al. |

It is certified that error appears in the above-identified patent and that said Letters Patent is hereby corrected as shown below:

On the Title Page, item (63) reading:
"Continuation of application No. 09/545,589, filed on Apr. 7, 2000, now Pat. No. 7,007,166, which is a continuation of application No. 08/674,726, filed on Jul. 2, 1996."

should read:
"Division of application No. 09/545,589, filed on Apr. 7, 2000, now Pat. No. 7,007,166, which is a continuation of application No. 08/674,726, filed on Jul. 2, 1996, now Pat. No. 7,362,775."

Column 1 lines 7-12 reading:
"This application is a continuation of U.S. patent application Ser. No. 09/545,589, filed Apr. 7, 2000, now U.S. Pat. No. 7,007,166, which is a continuation of U.S. patent application Ser. No. 08/674,726, filed Jul. 2, 1996. The previously identified patents and/or patent applications are hereby incorporated by reference, in their entirety."

should read:
"This application is a division of U.S. patent application Ser. No. 09/545,589, filed Apr. 7, 2000, now U.S. Pat. No. 7,007,166, which is a continuation of U.S. patent application Ser. No. 08/674,726, filed Jul. 2, 1996, now U.S. Pat. No. 7,362,775. The previously identified patents and/or patent applications are hereby incorporated by reference, in their entirety."

Signed and Sealed this
Fifteenth Day of March, 2011

David J. Kappos
*Director of the United States Patent and Trademark Office*

UNITED STATES PATENT AND TRADEMARK OFFICE
CERTIFICATE OF CORRECTION

PATENT NO. : 7,343,492 B2
APPLICATION NO. : 11/244213
DATED : March 11, 2008
INVENTOR(S) : Moskowitz et al.

Page 1 of 1

It is certified that error appears in the above-identified patent and that said Letters Patent is hereby corrected as shown below:

In the Specification

Column 11 line 19 change "1,000 bytes (or 1000.times.8 bits)" to -- 1,000 bytes (or 1000 × 8 bits) --

Column 26 line 44 change "that min 0>=min1." to -- that $min_0 >= min_1$. --

Column 26 line 45 change "VI=X×(min0-min1)," to -- $V_1 = X \times (min_0 - min_1)$, --

Column 27 line 9 change "Vreal=Vtheoretical+VC" to -- $V_{real} = V_{theoretical} + V_C$ --

Signed and Sealed this
Twenty-fifth Day of February, 2014

Michelle K. Lee
*Deputy Director of the United States Patent and Trademark Office*